(12) United States Patent
Paquet et al.

(10) Patent No.: US 10,725,244 B2
(45) Date of Patent: Jul. 28, 2020

(54) OPTICAL FIBER WITH CLADDING-EMBEDDED LIGHT-CONVERGING STRUCTURE FOR LATERAL OPTICAL COUPLING

(71) Applicant: INSTITUT NATIONAL D'OPTIQUE, Québec (CA)

(72) Inventors: Alex Paquet, Québec (CA); Marco Michele Sisto, Québec (CA); Yves Taillon, Québec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 0 days.

(21) Appl. No.: 16/189,636

(22) Filed: Nov. 13, 2018

(65) Prior Publication Data

US 2020/0150347 A1    May 14, 2020

(51) Int. Cl.

| | |
|---|---|
| G02B 6/32 | (2006.01) |
| G02B 6/34 | (2006.01) |
| G02B 6/42 | (2006.01) |
| G02B 6/30 | (2006.01) |
| G02B 6/02 | (2006.01) |

(52) U.S. Cl.
CPC .......... *G02B 6/30* (2013.01); *G02B 6/02085* (2013.01)

(58) Field of Classification Search
CPC .............................. G02B 6/30; G02B 6/02085
USPC ............................................... 385/33–38, 49
See application file for complete search history.

(56) References Cited

U.S. PATENT DOCUMENTS

| | | |
|---|---|---|
| 6,904,197 B2 | 6/2005 | Bhagavatula et al. |
| 7,162,124 B1 | 1/2007 | Gunn, III et al. |
| 7,298,945 B2 | 11/2007 | Gunn, III et al. |
| 8,064,745 B2 | 11/2011 | Fortusini et al. |

(Continued)

FOREIGN PATENT DOCUMENTS

EP    2808713 A1    12/2014

OTHER PUBLICATIONS

Van Laere, F. et al., Compact Focusing Grating Couplers for Silicon-on-Insulator Integrated Circuits, IEEE Photonics Technology Letters, vol. 19, No. 23. p. 1919-1921, Dec. 1, 2007.

(Continued)

*Primary Examiner* — Kaveh C Kianni
*Assistant Examiner* — Hung Q Lam
(74) *Attorney, Agent, or Firm* — Fitch, Even, Tabin & Flannery LLP

(57) ABSTRACT

Optical coupling techniques between an optical fiber and another optical device, such as a planar optical waveguide, or a probed region are disclosed. An optical fiber for lateral optical coupling includes a cladding, a core disposed in the cladding, a reflecting structure inclined relative to the fiber axis, and a light-converging structure embedded in the cladding. The reflecting structure is configured to reflect light between the core and a lateral coupling path extending and providing lateral optical coupling between the core and an exterior of the fiber. The cladding-embedded light-converging structure is configured to intercept and converge light traveling along the lateral coupling path. In some implementations, the optical fiber is a fiber-optic transition coupled between a main optical fiber and another optical device or a probed region. A coupled optical system including an optical fiber coupled to another optical device is also disclosed.

20 Claims, 29 Drawing Sheets

(56) References Cited

U.S. PATENT DOCUMENTS

| | | |
|---|---|---|
| 10,429,597 B2 * | 10/2019 | ten Have .............. G02B 6/126 |
| 2003/0095746 A1 | 5/2003 | Williamson |
| 2004/0013358 A1 | 1/2004 | Zhang |
| 2013/0022316 A1 | 1/2013 | Pelletier et al. |
| 2014/0147079 A1 | 5/2014 | Doerr et al. |
| 2017/0075070 A1 * | 3/2017 | Lohse .................... G02B 6/30 |

OTHER PUBLICATIONS

Wei, C. et al., Integrated Optical Elliptic Couplers: Modeling, Design, and Applications, Journal of Lightwave Technology, vol. 15, No. 5. p. 906-912, May 1997.

Noda, J. et al., Polarization-Maintaining Fibers and Their Applications, Journal of Lightwave Technology, vol. LT-4, No. 8. p. 1071-1089, Aug. 1986.

Yoshida, T. et al., Vertical silicon waveguide coupler bent by ion implantation, Optics Express, vol. 23, No. 23. p. 29449-29456, Nov. 3, 2015.

* cited by examiner

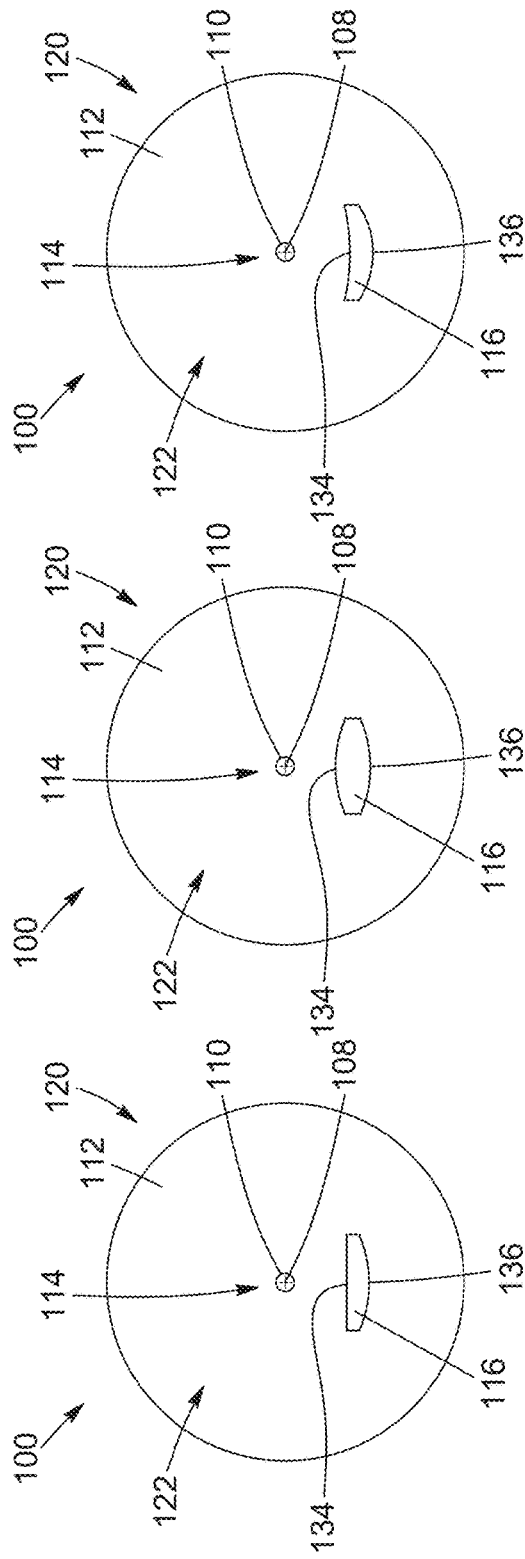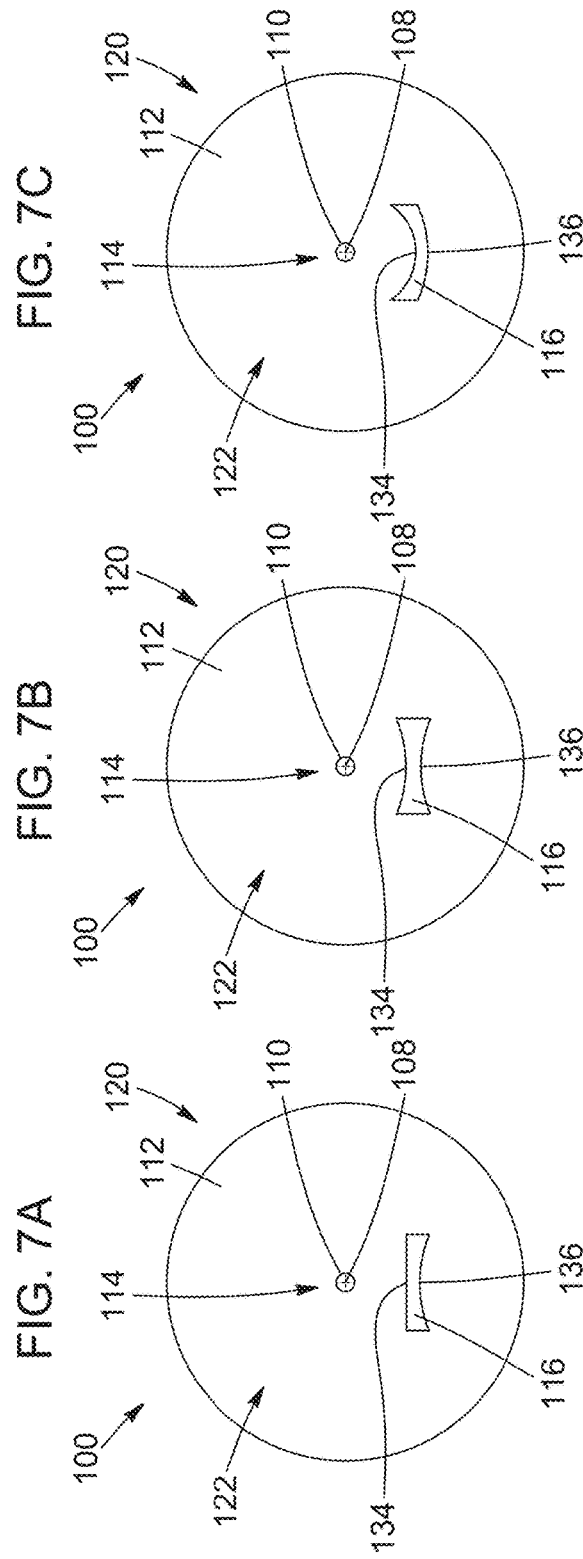

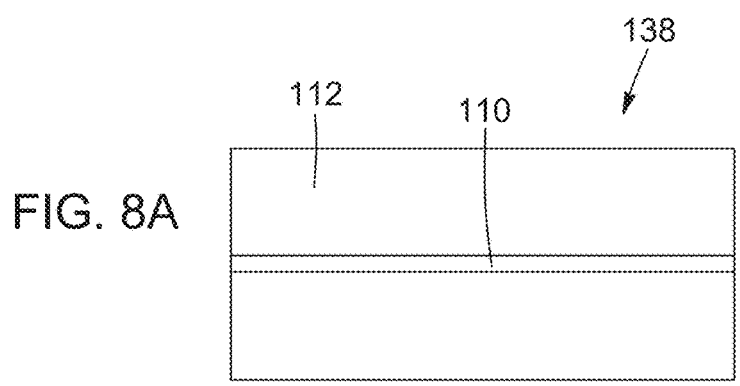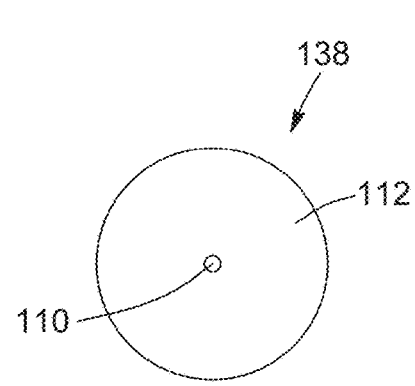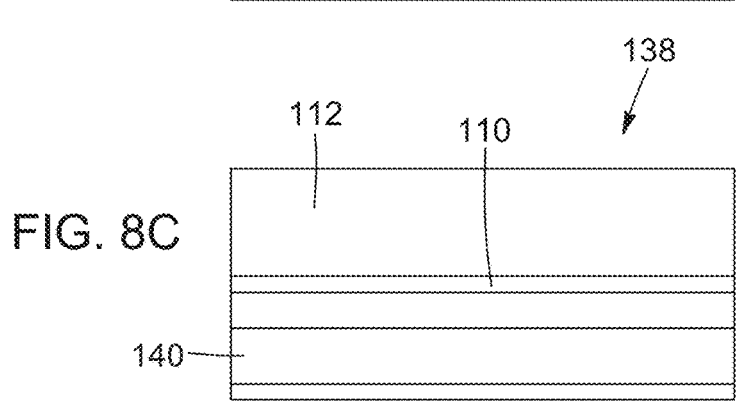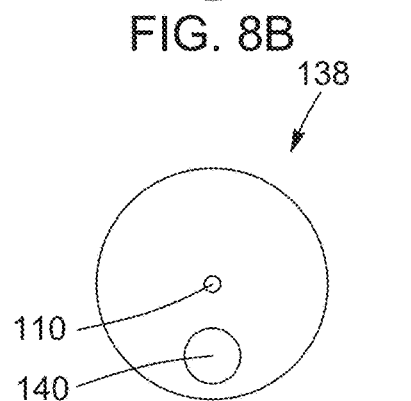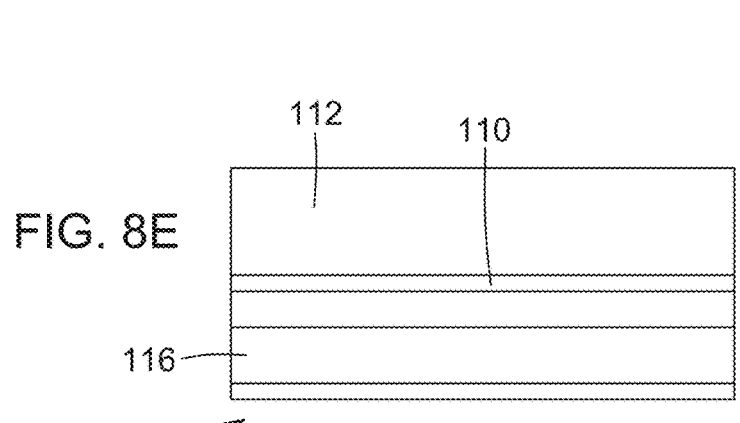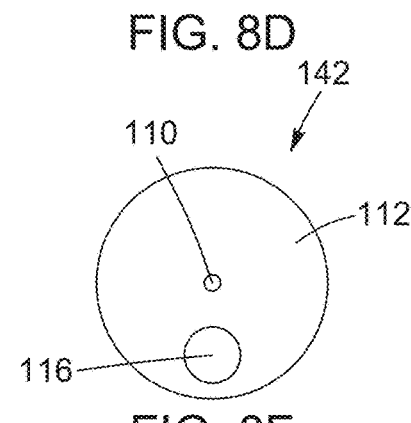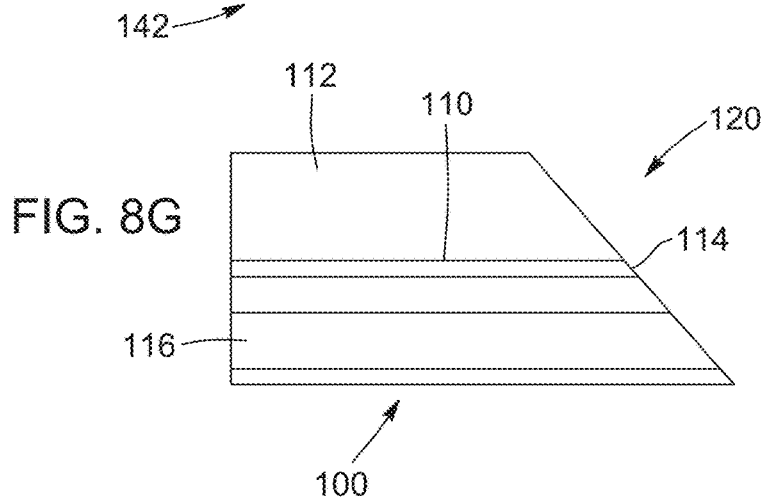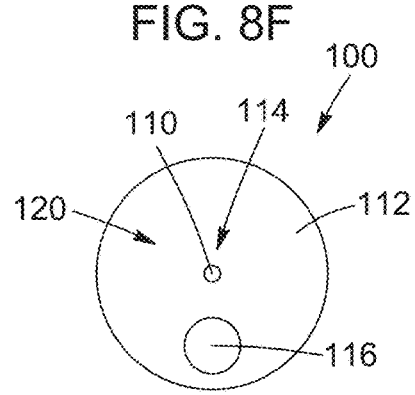

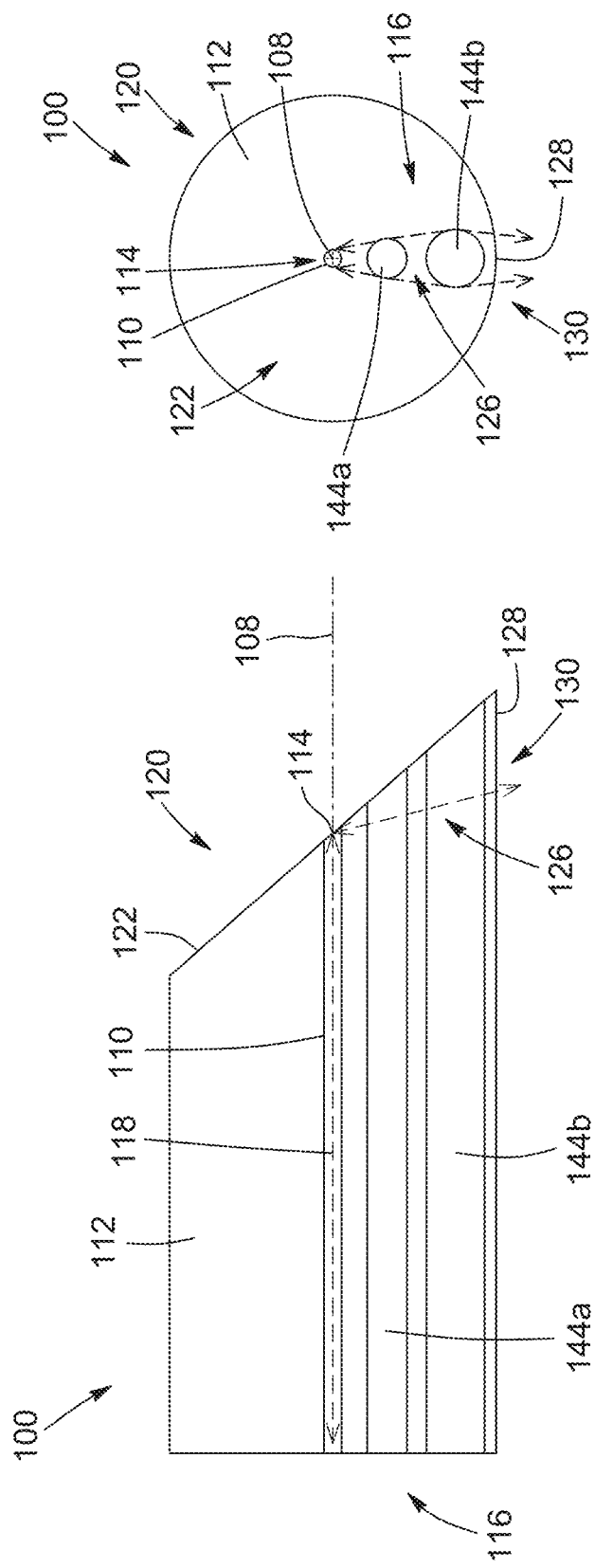

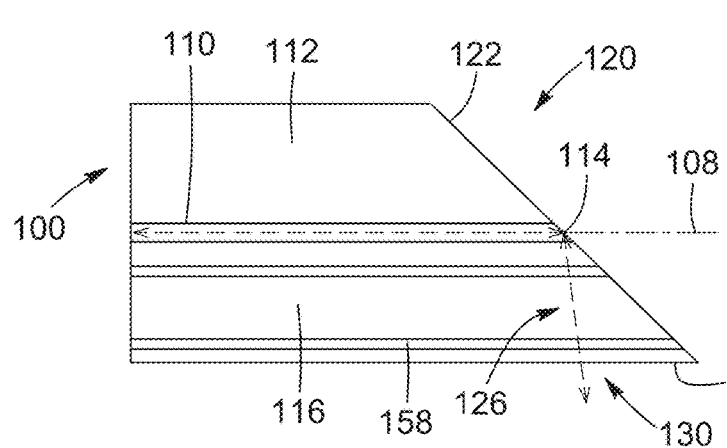
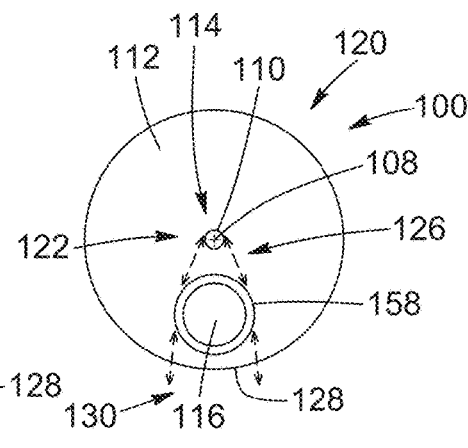
FIG. 13A  FIG. 13B
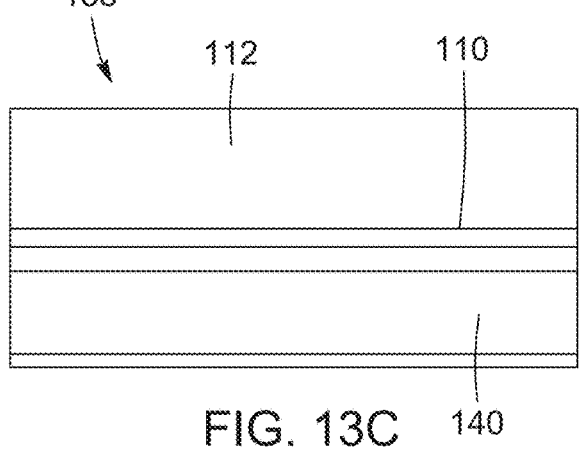
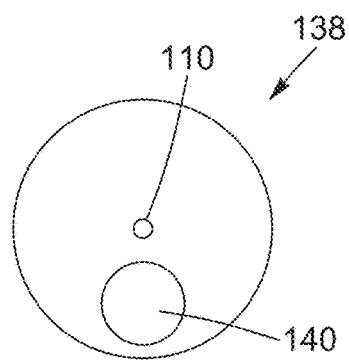
FIG. 13C  FIG. 13D
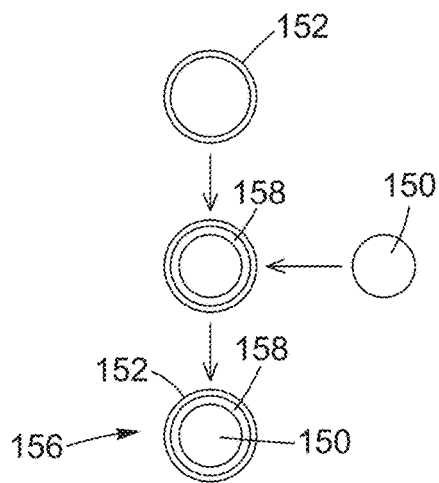
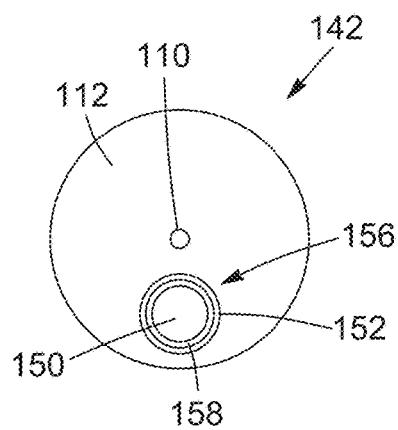
FIG. 13E  FIG. 13F

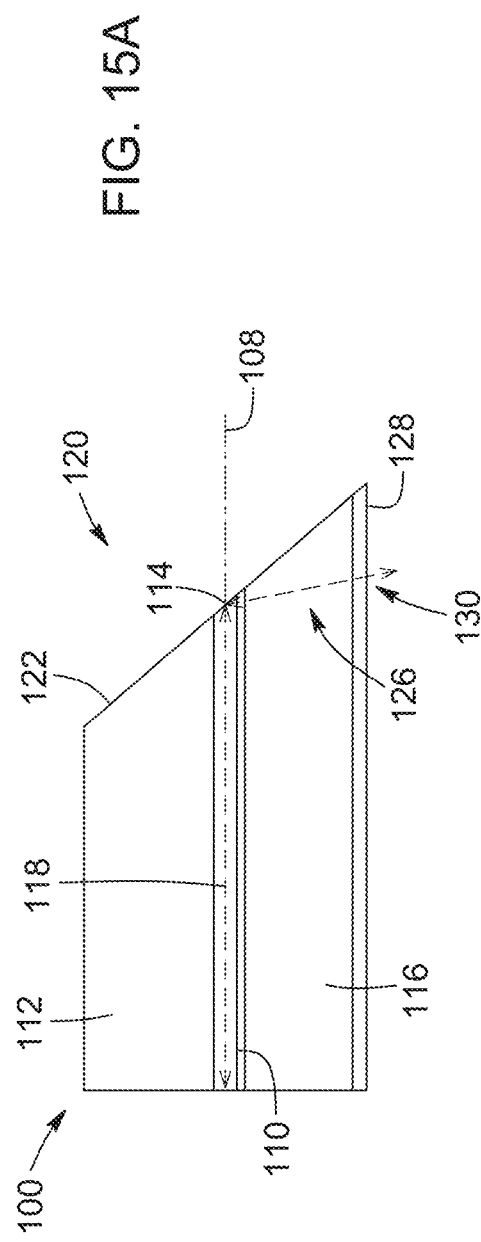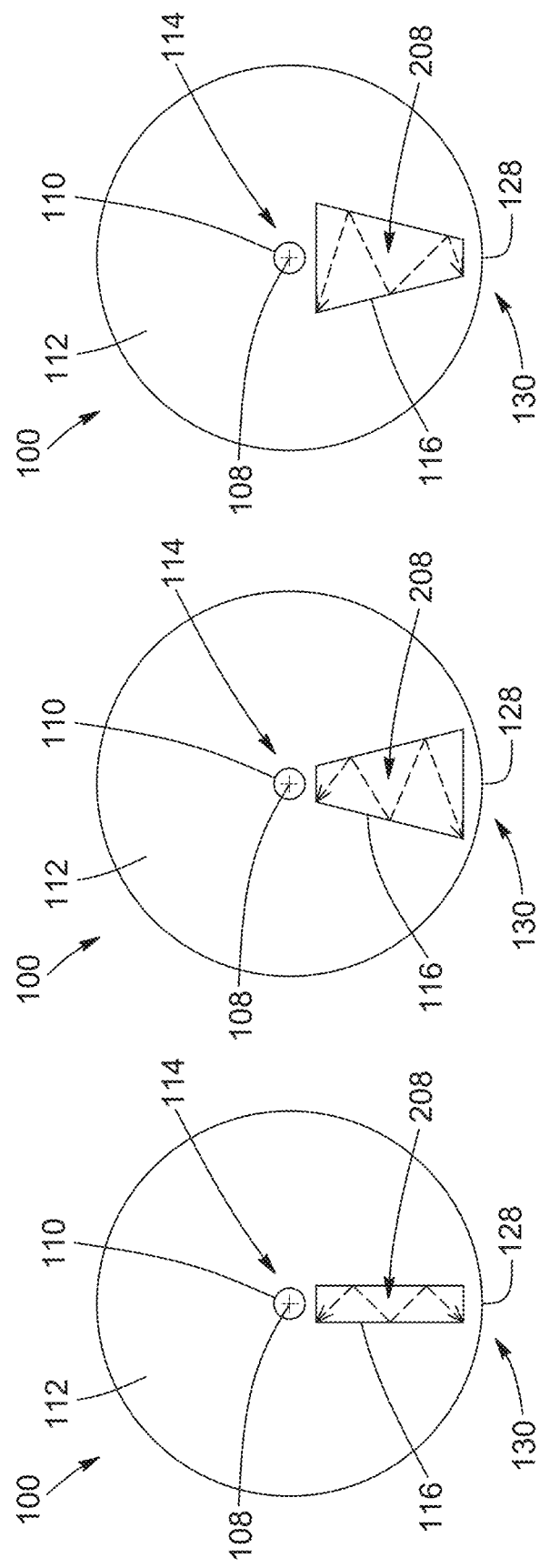

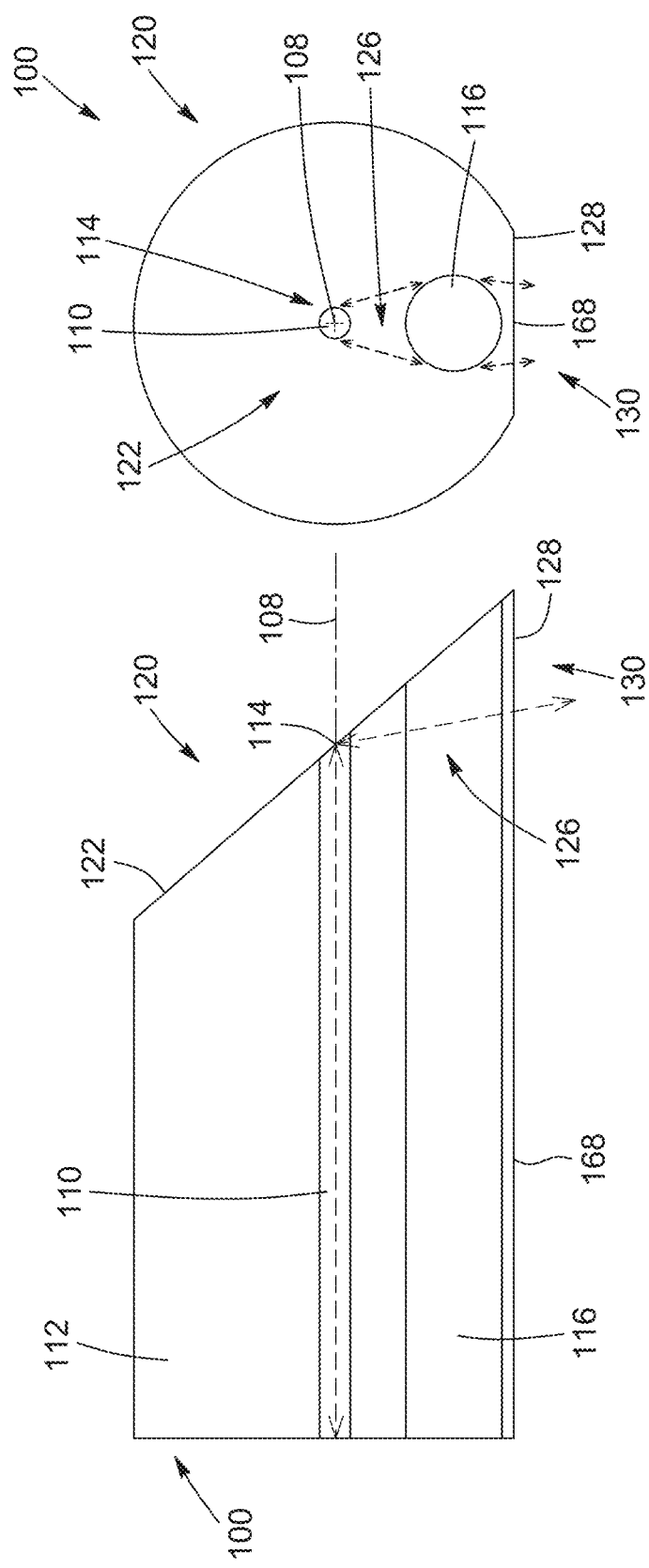

| Parameters | Coupling configurations | | | |
|---|---|---|---|---|
| | Conventional approach | Rod | Hole | 2D slab |
| Distance from core and other geometrical parameters | - | 45 μm (center-to-center) | Inner face = 40 μm<br>Air distance (middle) = 5 μm | Start of slab = 13 μm<br>Width of slab = 9 μm |
| Curvature radius | - | 8 μm | Inner radius = 40 μm<br>Outer radius = 40 μm | - |
| Refractive index | Cladding: 1.445 | FCM (glass): 1.4920 (at 1560 nm) | FCM (air): 1 | Slab = 1.45023 (at 1560 nm) |
| Image of FDTD simulation | 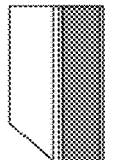 | 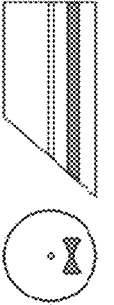 | 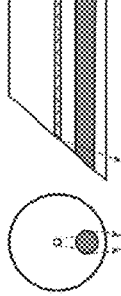 |  |
| Simulated coupling power at peak wavelength (1560 nm) | 33% | 40% | 38% | 39% |

FIG. 21

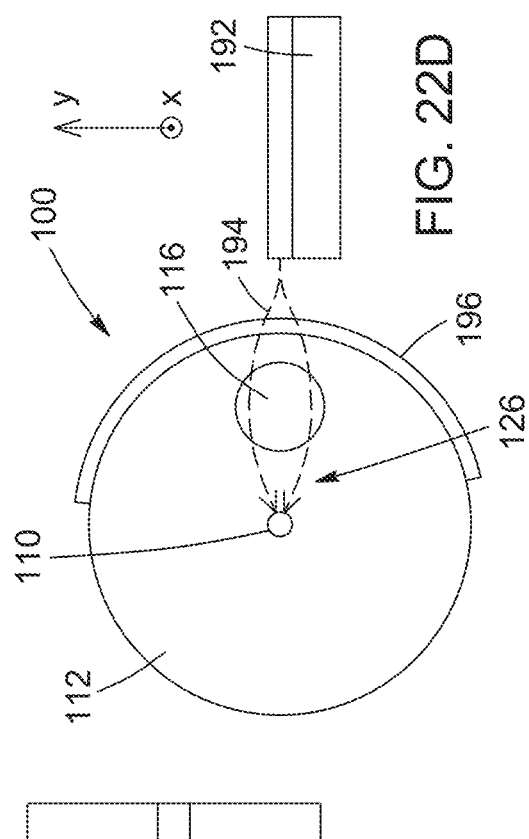
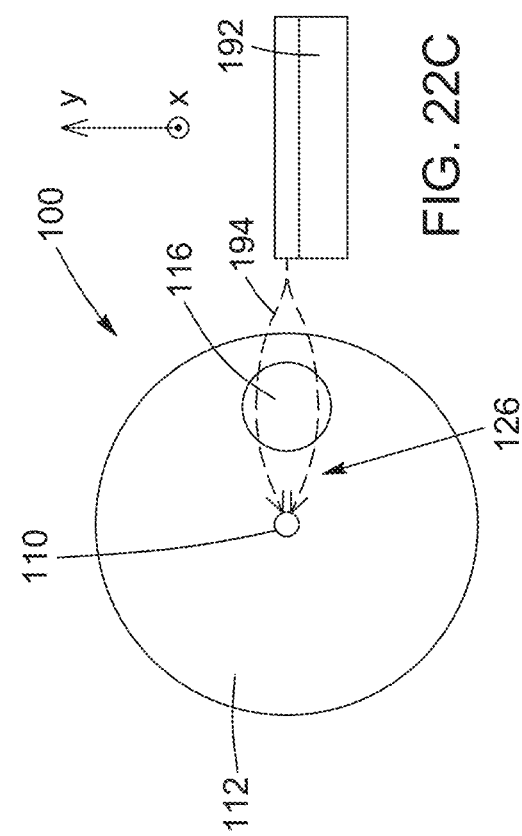
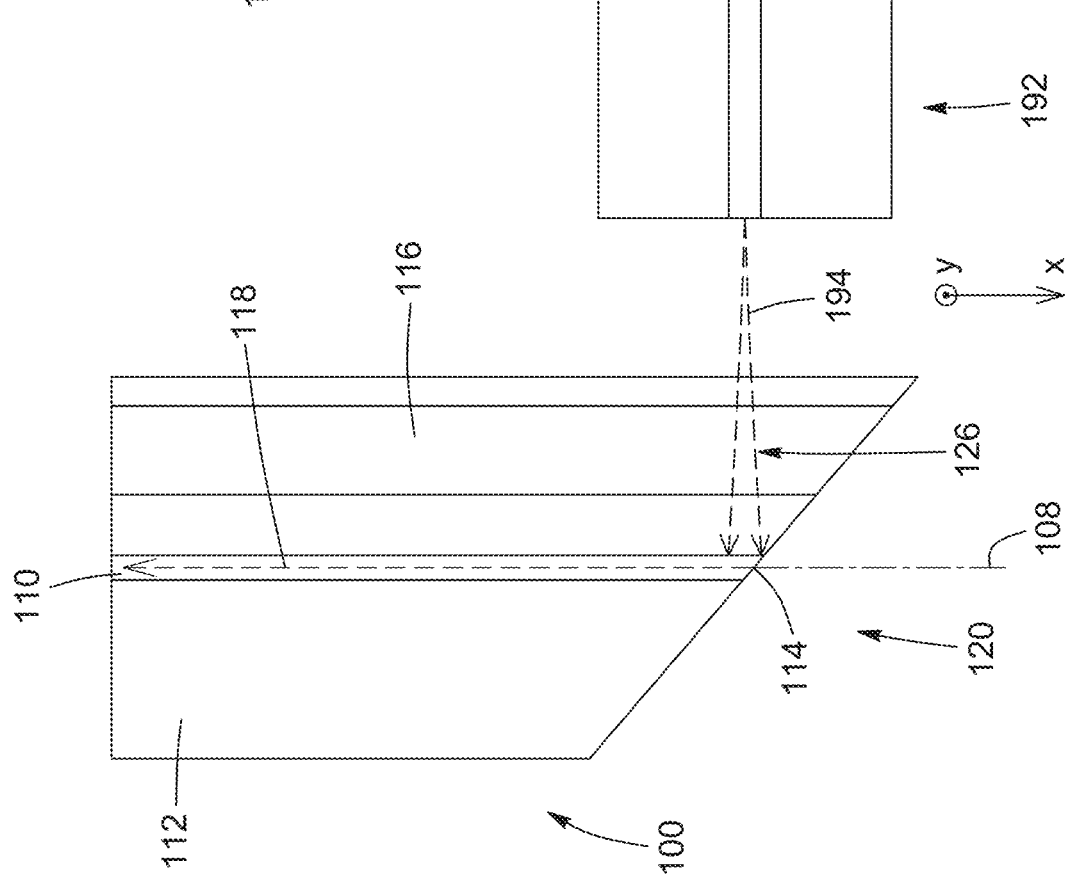

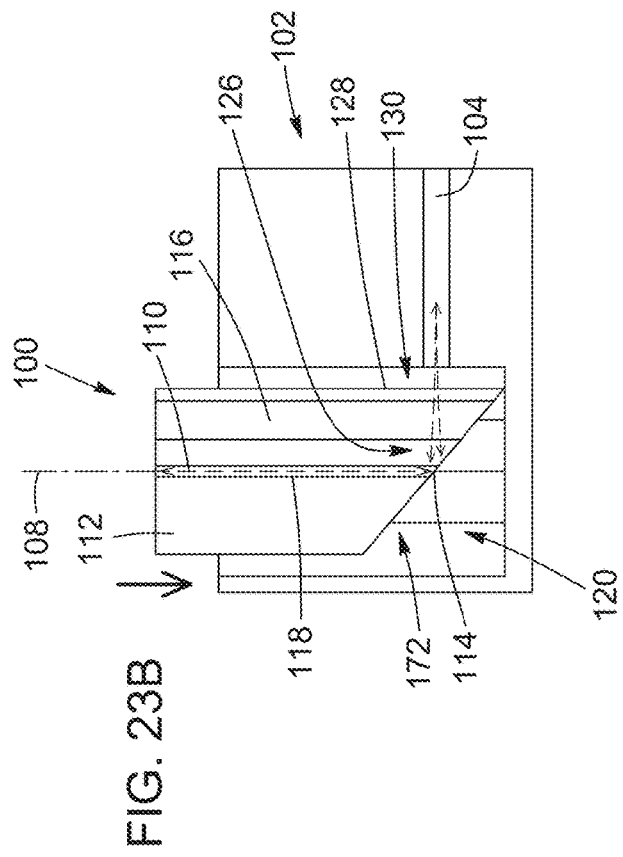
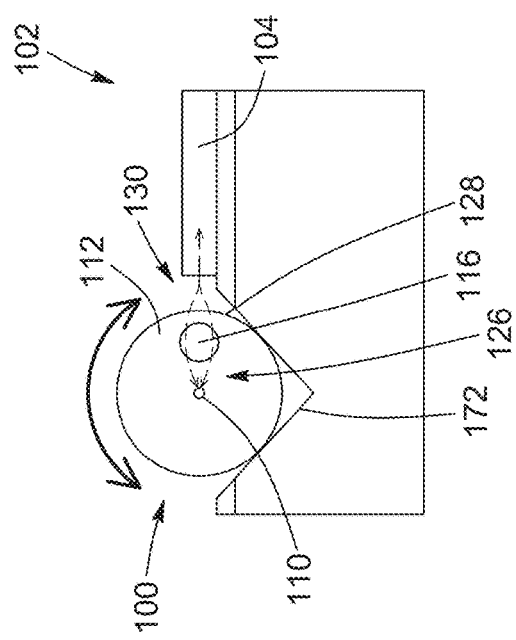
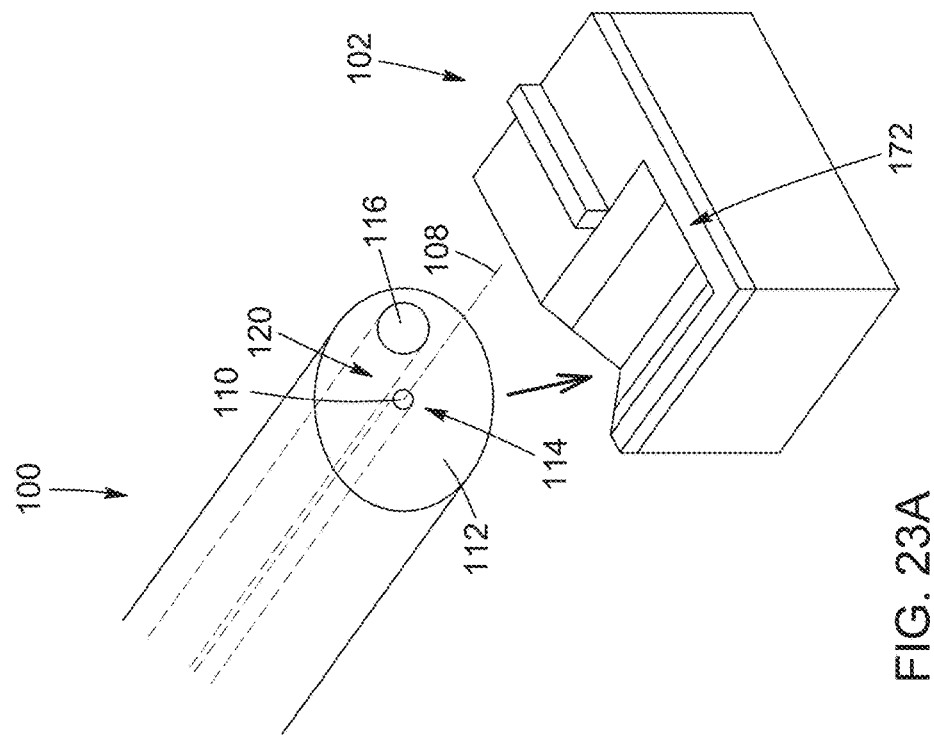
FIG. 23B
FIG. 23C
FIG. 23A

OPTICAL FIBER WITH CLADDING-EMBEDDED LIGHT-CONVERGING STRUCTURE FOR LATERAL OPTICAL COUPLING

TECHNICAL FIELD

The technical field generally relates to optical fibers, and more particularly, to optical fiber coupling techniques for use in various applications including, but not limited to, integrated photonics applications.

BACKGROUND

The transmission of optical signals between optical fibers and integrated optical waveguides poses several technological challenges, and various approaches have been suggested to improve light coupling efficiency. One type of approach uses diffraction gratings to couple light vertically, or nearly vertically, between a single-mode optical fiber and an integrated waveguide. In a typical configuration, the optical fiber is disposed vertically, or nearly vertically, over the waveguide and a diffraction grating is disposed on or near the surface of the waveguide for directing light from and/or to the optical fiber. Such a configuration usually results in a large overall package footprint, which can prevent or limit miniaturization and associated cost reduction.

An approach to alleviate these limitations is to provide the optical fiber with an angled end to define a reflecting surface configured to laterally couple light between the core of the optical fiber and the diffracting grating coupler. One drawback of this approach is that the light reflected by the reflecting surface is coupled out of the core as a diverging light beam whose cross-sectional area increases as it propagates laterally outwardly through the cladding and toward the diffraction grating. A similar situation arises for light coupled from the diffracting grating toward the fiber. In a standard single-mode fiber with a cladding diameter of 125 micrometers (μm), the reflecting surface and the diffraction grating are separated from each other by at least 62.5 μm. Such a distance can be sufficiently large to cause mode size mismatch at the diffraction grating, resulting in optical power losses that degrade the coupling efficiency. Other approaches have attempted to overcome or at least mitigate this beam-divergence-induced mismatch issue, for example by providing a non-flat reflecting surface or by thinning or tapering the fiber cladding to bring the fiber core closer to the diffraction grating. In such approaches, each fiber is manufactured individually using high-precision machining or polishing processes. Consequently, various challenges remain in the field of optical fiber coupling techniques.

SUMMARY

The present description generally relates to optical coupling in fiber-based systems and devices, and more particularly, to techniques for enabling lateral coupling of light between an optical fiber and another optical device, for example an integrated photonics device, or a probed region.

In accordance with an aspect, there is provided an optical fiber for lateral optical coupling. The optical fiber includes a cladding; a core disposed in the cladding to form; a reflecting structure inclined relative to the fiber axis and configured to reflect light between the core and a lateral coupling path extending and providing lateral coupling of light between the core and an exterior of the optical fiber; and a light-converging structure embedded in the cladding to intercept and converge light traveling along the lateral coupling path.

The lateral coupling path can provide either unidirectional or bidirectional coupling. In unidirectional applications, light can be coupled into the lateral coupling path either from the core to the exterior of the fiber or from the exterior of the fiber to the core, but not both, while in bidirectional applications, light can be coupled into the lateral coupling path in both directions. Thus, depending on the application or use, the optical fiber can provide any or all of the following types of lateral optical coupling: unidirectional coupling of light from the core to the exterior of the fiber, where the reflecting structure is configured to reflect light propagating in the core out of the core and into the lateral coupling path for coupling out of the optical fiber and delivery to another optical device or a region of interest; unidirectional coupling of light from the exterior of the fiber, for example from another optical device or a region of interest, to the core, where the reflecting structure is configured to reflect in-coupled light traveling along the lateral coupling path out of the lateral coupling path and into the core as guided light for propagation therein; and bidirectional coupling of light between the core and the exterior of the fiber.

In some implementations, the optical fiber has an angled end that includes or forms the reflecting structure. However, in other implementations, the reflecting structure may be provided at an intermediate location along the optical fiber, rather than at an end thereof. For example, the optical fiber can have a cavity extending laterally through the cladding and inside the core, such that the cavity includes or forms the reflecting structure. Depending on the application, the reflecting structure may operate by total internal reflection inside the core or be provided as a reflecting layer formed on the core. For example, the reflecting layer can include a metallic or a dielectric coating deposited on the angled end of the core or on a portion of the cavity. In other implementations, the reflecting structure can include a tilted fiber Bragg grating disposed in the core and having its grating axis tilted with respect to the fiber axis.

In some implementations, the optical fiber can be used in optical probing applications, for example as the tip of an optical probe such as a fiber endoscope. In some of these implementations, the cladding can include a first cladding layer surrounding the core and a second cladding layer surrounding the first cladding layer. In such a case, the reflecting structure can be configured to reflect guided core light out of the core and into the lateral coupling path for delivery to a probed region outside the optical fiber and to reflect light collected from the probed region from the lateral coupling path to the first cladding layer for guided propagation thereinside as guided cladding light. In such implementations, the guided core light to be delivered to the probed region and the guided cladding light collected from the probed region propagate in opposite directions inside the optical fiber.

The cladding-embedded light-converging structure is configured to receive or intercept light rays propagating along the lateral coupling path and to make the light rays at least less diverging after passage of the light rays therein. Thus, the light-converging structure is configured such that converging input rays become more converging, parallel input rays become converging rays, and diverging input rays become less diverging, parallel (e.g., planar wavefront) or converging. The light-converging structure can produce an output signal of reduced footprint size and increased irradiance. By reducing the angular spread of the irradiance distribution of the laterally coupled light exiting the lateral coupling path, the provision of the light-converging structure can enhance the coupling efficiency of light into or out of the optical fiber.

Depending on the application, the cladding-embedded light-converging structure can have various shapes, geometrical dimensions, material compositions, refractive indices, spatial arrangements and orientations, numbers of separate individual parts, and the like. In some implementations, the light-converging structure can include one or more rod insertions embedded in and extending longitudinally along the entire length of the cladding. For example, the one or more longitudinally extending rod insertions can consist of a single longitudinally extending rod insertion or multiple rod insertions radially distributed along the lateral coupling path. However, in other implementations, the light-converging structure can have a longitudinal dimension that is less than a length of the cladding.

In some implementations, the light-converging structure can include an inward-facing surface and an outward-facing surface located respectively closer to and farther from the fiber core. Each surface can be characterized by its curvature, which may be convex, concave, flat or a combination thereof, when viewed from the outside of the light-converging structure. Depending on the application, the light-converging structure can be made of a material having either a refractive index higher or lower than the refractive index of the surrounding cladding. The sign of the refractive index difference between the light-converging structure and the cladding may determine the type of surface curvature of the light-converging structure. In some implementations, the light-converging structure can have an overall convex shape when its refractive index is higher than that of the cladding and an overall concave shape when its refractive index is lower than that of the cladding. In general, various combinations of refractive index differences and surface shapes can be envisioned within the scope of the present disclosure.

In some implementations, the light-converging structure comprises an antireflection coating formed on at least part of an outer surface thereof in contact with the cladding to prevent or reduce unwanted or detrimental interface reflections caused by the refractive index mismatch between the light-converging structure and cladding. In some implementations, the light-converging structure can be a hole or cavity formed in the cladding. The hole or cavity can be filled with air or another material.

In some implementations, the light-converging structure can include a refractive converging element configured to receive and focus light traveling along the lateral coupling path. In some scenarios, the refractive converging element can include a plano-convex, a biconvex or a positive meniscus cylindrical lens element made of a material having a refractive index higher than a refractive index of the cladding. In other scenarios, the refractive converging element can include a plano-concave, a biconcave or a negative meniscus cylindrical lens element made of a material having a refractive index lower than a refractive index of the cladding. In some implementations, the refractive converging element can act as a cylindrical lens configured to focus an incoming irradiance distribution predominantly along one dimension to produce a beam having an anisotropic irradiance distribution. For example, such an anisotropic beam can include a beam having an elliptically shaped irradiance profile or high astigmatism, or in the limiting case, a beam focused to a line.

In some implementations, the light-converging structure can include a waveguiding element configured to confine and guide light therein along a waveguiding path forming at least part of the lateral coupling path between the core and exterior of the optical fiber. For example, the waveguiding element can be a slab waveguide made of material having a refractive index higher than a refractive index of the cladding and extending widthwise along the lateral coupling path and lengthwise along the fiber axis.

In some implementations, the presence of the cladding-embedded light-converging structure does not adversely disturb or affect propagation of guided light in the core, notably in the fundamental mode. In such implementations, the physical separation and/or refractive index difference between the core and the light-converging structure can be designed or engineered to avoid or at least mitigate such unwanted or adverse perturbations.

In some implementations, the optical fiber includes an angled end that includes or forms the reflecting structure and a fiber-coupling end opposite the angled end and configured for coupling the optical fiber to a main optical fiber. In such implementations, the optical fiber operates as a fiber-optic transition coupler for coupling light between the main optical fiber, via the fiber-coupling end, and an optical device or a probed region, via the lateral coupling path at the angled end. The fiber-optic transition coupler can provide a more efficient coupling of light to and/or from the main optical fiber. In some implementations, the optical fiber operating as a fiber-optic transition coupler can be a relatively short fiber segment, for example having a fiber length ranging from about 0.1 centimeter (cm) to about 100 cm. In some implementations, the optical device can be a planar optical waveguide provided on a photonic integrated optical circuit or chip. In other implementations, the optical device can be an optical source, for example an edge-emitting laser diode. In yet other implementations, the fiber-optic transition coupler can be used in an optical probe, for example as the distal tip of a fiber endoscope configured for delivery of probing light to a target region, with or without signal collection.

In accordance with another aspect, there is provided a coupled optical system including an optical device and an optical fiber optically coupled to the optical device. The optical fiber includes a cladding; a core disposed in the cladding; a reflecting structure configured to reflect light between the core and a lateral coupling path extending in the cladding between the core and an exterior of the optical fiber to provide lateral optical coupling between the core and the optical device; and a light-converging structure embedded in the cladding to intercept and converge light traveling along the lateral coupling path.

In some implementations, the optical device can be a photonic integrated circuit comprising a planar optical waveguide, for example a grating-coupled waveguide or an edge-coupled waveguide. In other implementations, the optical device can be an optical source configured to emit a source optical signal and the optical fiber is configured to collect the source optical signal via the lateral coupling path for coupling the source optical signal as guided light into the core. For example, the optical source can be an edge-emitting laser diode.

In some implementations, the coupled optical system can include a support structure configured to support the optical fiber. For example, the support structure can be a V-groove support structure including a V-groove configured to receive the optical fiber. In some implementations, the optical fiber is one of a plurality of optical fibers coupled to the optical device. For example, the optical device can be a photonic integrated circuit including a plurality of planar optical waveguides, each of which optically coupled to a corresponding one of the optical fibers. In such a case, the V-groove support structure can include a plurality of V-grooves, each of which to receive a corresponding one of the optical fibers in a parallel, side-by-side and spaced-apart relationship. The provision of the V-groove support structure can ensure or facilitate positioning and alignment of the optical fibers for coupling to the optical device. In some implementations, a lid cover can be provided over the optical fibers received in the V-groove support structure, the lid cover being interposed between the optical fibers and the optical fibers and being traversed by light coupled therebetween.

In some implementations, the coupled optical system can include a support structure configured to support the optical fiber. For example, the support structure can be a V-groove support structure include a V-groove configured to receive the optical fiber. In some implementations, the optical fiber is one a plurality of optical fibers coupled to the optical device. For example, the optical device can be a photonic integrated circuit including a plurality of planar optical waveguides, each of which optically coupled to a corresponding one of the optical fibers. In such a case, the V-groove support structure can include a plurality of V-grooves, each of which to receive a corresponding one of the optical fibers in a parallel, side-by-side and spaced-apart relationship. The provision of the V-groove support structure can ensure or facilitate positioning and alignment of the optical fibers for coupling to the optical device. In some implementations, a lid cover can be provided over the optical fibers received in the V-groove support structure, the lid cover being interposed between the optical fibers and the optical fibers and being traversed by light coupled therebetween.

In accordance with another aspect, there is provided a fiber-optic transition coupler or device for optical coupling between a main optical fiber and another optical device or a probed region. The fiber-optic transition coupler includes fiber-coupling end configured for coupling to the main optical fiber and an angled end opposite the fiber-coupling end. The fiber-optic transition coupler also includes a cladding, a core disposed in the cladding, a reflecting surface extending on the angled end, and a light-converging structure embedded in the cladding. The reflecting surface is configured to reflect light between the core and the light-converging structure is configured to intercept and converge light traveling along the lateral coupling path.

In accordance with another aspect, there is provided a method for fabricating an optical fiber having a cladding, a core, a reflecting structure, and a cladding-embedded light-converging structure, such as disclosed herein.

It is to be noted that other method and process steps may be performed prior, during or after the steps described herein. The order of one or more steps may also differ, and some of the steps may be omitted, repeated and/or combined, depending on the application.

Other features and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

BRIEF DESCRIPTION OF THE DRAWINGS

FIGS. 7A to 7F are schematic front views of other possible embodiments of a coupled optical system including an optical fiber coupled to a planar optical waveguide. In each embodiment, the cladding-embedded light-converging structure includes a refractive converging element having a different transverse cross-sectional shape.

FIGS. 8A to 8H are schematic representations of example steps of a fabrication method of an optical fiber including a cladding-embedded light-converging structure, in accordance with another possible embodiment.

FIGS. 10A and 10B are respectively schematic side and front views of an optical fiber, in accordance with another possible embodiment. The optical fiber includes a cladding-embedded light-converging structure including a pair of longitudinally extending rod insertions distributed along the lateral coupling path.

FIGS. 13A and 13B are respectively schematic side and front views of an optical fiber, in accordance with another possible embodiment. The optical fiber includes a cladding-embedded light-converging structure having an antireflection coating thereon. FIGS. 13C to 13F schematically depict an example of process steps for fabricating a final preform ready for drawing into the optical fiber of FIGS. 13A and 13B.

FIGS. 15A and 15B are respectively schematic side and front views of an optical fiber, in accordance with another possible embodiment. The optical fiber includes a cladding-embedded light-converging structure configured to function as a two-dimensional slab waveguide within which light coupled into the lateral coupling path is to be confined and guided. FIGS. 15C and 15D are schematic front views of an optical fiber, in accordance with other possible embodiments, wherein the light-converging structure is a two-dimensional slab waveguiding tapering radially toward (FIG. 15O) and away (FIG. 15D) from the fiber axis.

FIGS. 16A and 16B are respectively schematic side and front views of an optical fiber, in accordance with another possible embodiment, in which the optical fiber includes structural modifications to its outer lateral surface.

FIG. 21 is a table that includes computer simulation parameters and results representing the lateral coupling efficiency of three embodiments compared to a conventional angled-fiber-based lateral coupling technique.

FIGS. 22A to 22C are respectively schematic perspective, side and front views of an optical fiber, in accordance with another possible embodiment, in which the optical fiber is used in a laser diode coupling application. FIG. 22D is a variant in which an antireflection coating is provided over a portion of the outer lateral surface of the fiber facing the laser diode.

FIGS. 23A to 23C are respectively schematic perspective, side and front views of an optical fiber, in accordance with another possible embodiment, in which the optical fiber is used for edge coupling with a planar optical waveguide. In FIG. 23B, the arrow indicates the direction along which the optical fiber is pushed until it abuts against a stop wall of a V-groove receiving the optical fiber. In FIG. 23C, the arrow indicates the rotational degree of freedom to allow adjustment of the optical fiber with respect to the planar optical waveguide and to control the optical coupling efficiency therebetween.

DETAILED DESCRIPTION

Figure 1A:
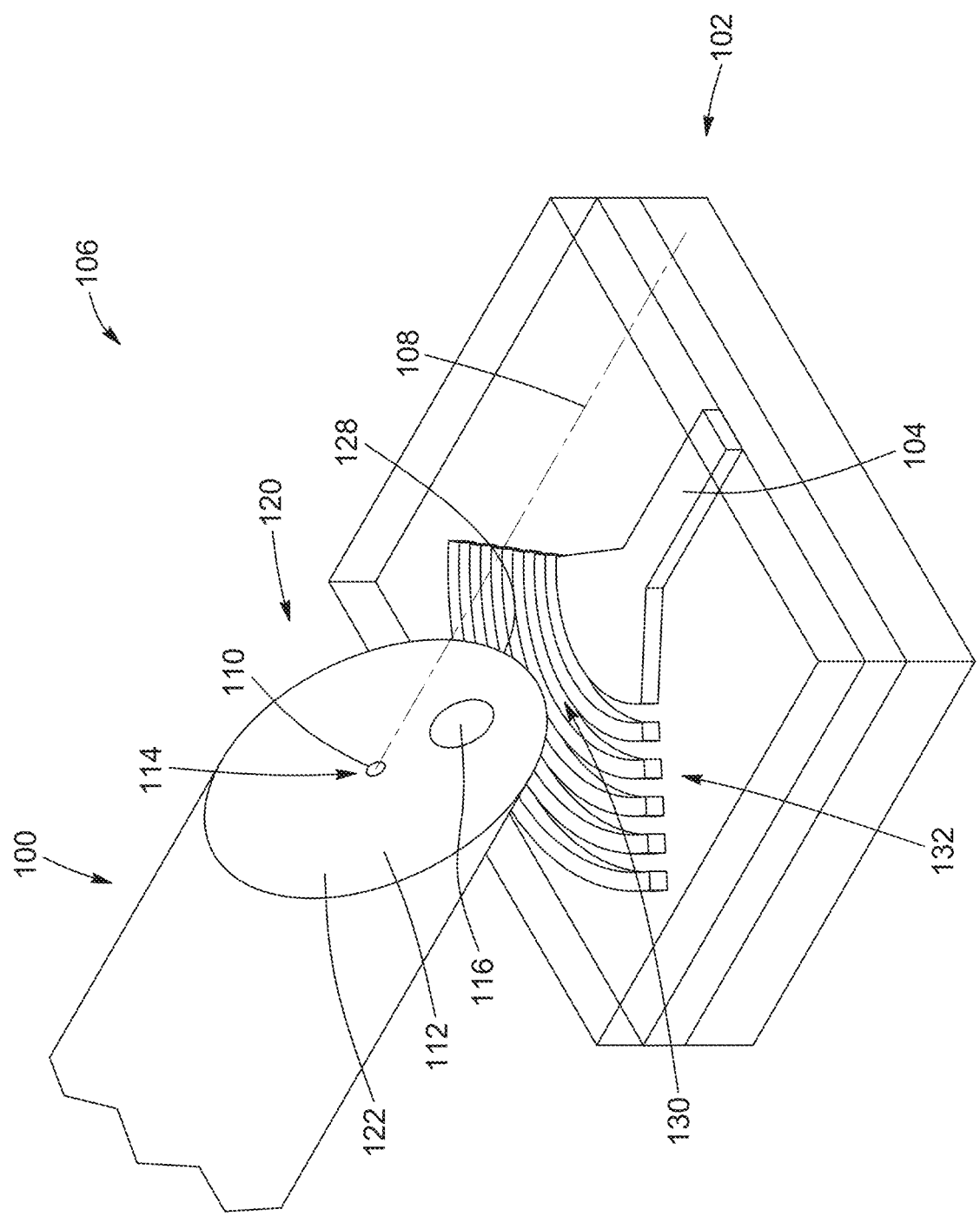
FIGS. 1A to 1C are schematic perspective, side and front views, respectively, of a coupled optical system including an optical fiber coupled to a planar optical waveguide, in accordance with a possible embodiment.

In the present description, similar features in the drawings have been given similar reference numerals. To avoid cluttering certain figures, some elements may not be indicated, if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

Unless stated otherwise, the terms "connected", "coupled", and derivatives and variants thereof, refer to any connection or coupling, either direct or indirect, between two or more elements. The connection or coupling between the elements may be mechanical, optical, electrical, magnetic, logical, or a combination thereof.

In the present description, the terms "a", "an" and "one" are defined to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for proper operation of this exemplary embodiment for its intended application.

The present description generally relates to optical coupling in fiber-based systems and devices. In accordance with various non-limiting aspects, the present description discloses an optical fiber for lateral optical coupling; a coupled optical system including an optical fiber and an optical device coupled thereto; a fiber-optic transition coupler for optical coupling between a main optical fiber and another optical device or a probed region; and a method for fabricating an optical fiber such as disclosed herein.

The present techniques can be used in various applications where it is desirable or required to provide coupling of light between an optical fiber and another optical device or a probed region. More particularly, the present techniques can be implemented in a variety of fiber-based light delivery and/or collection systems for use in fields such as, for example, integrated photonics, biophotonics, telecommunications, sensing, and spectroscopy. Non-limiting examples of possible applications include: light delivery to and/or light collection from an integrated optical device, for example a photonic integrated chip or a semiconductor laser; and delivery of probing light to a target using fiber endoscopes, fiber probes and fiber-based medical probes, with or without signal collection from the target. For example, fiber probes without signal collection can be used in phototherapy applications.

In the present description, the terms "light" and "optical", and derivatives and variants thereof, are used to refer to radiation in any appropriate region of the electromagnetic spectrum. These terms are not limited to visible light but can also include invisible regions of the electromagnetic spectrum including, but not limited to, the infrared wavelength range. For example, in non-limiting embodiments, the present techniques can be implemented with light having a wavelength band lying somewhere in the range from about 400 nanometers (nm) to about 1800 nm. However, this range is provided for illustrative purposes only and the present techniques may operate outside this range.

The terms "longitudinal", "axial", and derivatives and variants thereof, refer herein to a direction that is parallel or substantially parallel to the length or the fiber axis of the optical fiber from or to which light is coupled. Meanwhile, the terms "transverse", "lateral", "radial", and derivatives and variants thereof, refer to a direction that lies in a plane perpendicular or substantially perpendicular to the length or the fiber axis of the optical fiber, and therefore to the longitudinal or axial direction as just defined.

In the present description, the term "probed region" is to be interpreted broadly to encompass any object, structure, substance, material, person or other living organism, environment, medium or region of space to which light can be transmitted and/or from which light can be received. Furthermore, the term "fiber probe" and "fiber-based optical probe", and derivatives and variants thereof, are intended to refer to any fiber-based optical system or device which can deliver optical energy to a region of interest and/or collect optical energy from the region of interest. That is, these terms are meant to encompass optical systems and devices used solely for light delivery, optical systems and devices used solely for light collection, and optical systems and devices used for both light delivery and light collection.

Various implementations of the present techniques will now be described with reference to the figures.

Figure 1B:
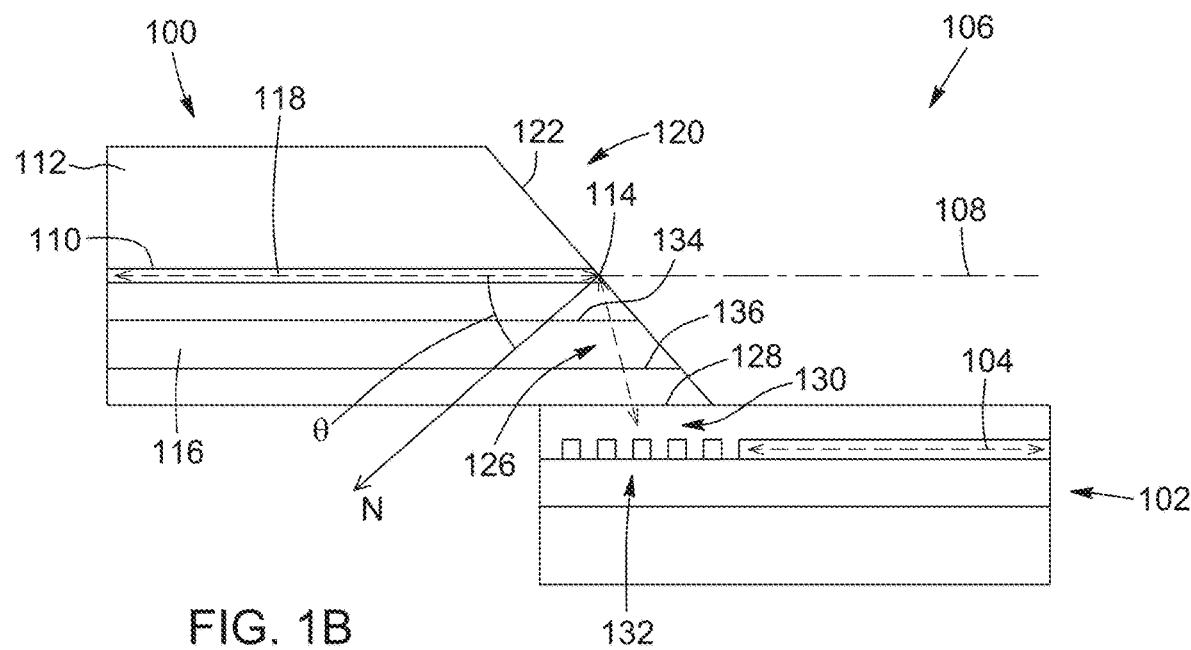
Figure 1C:
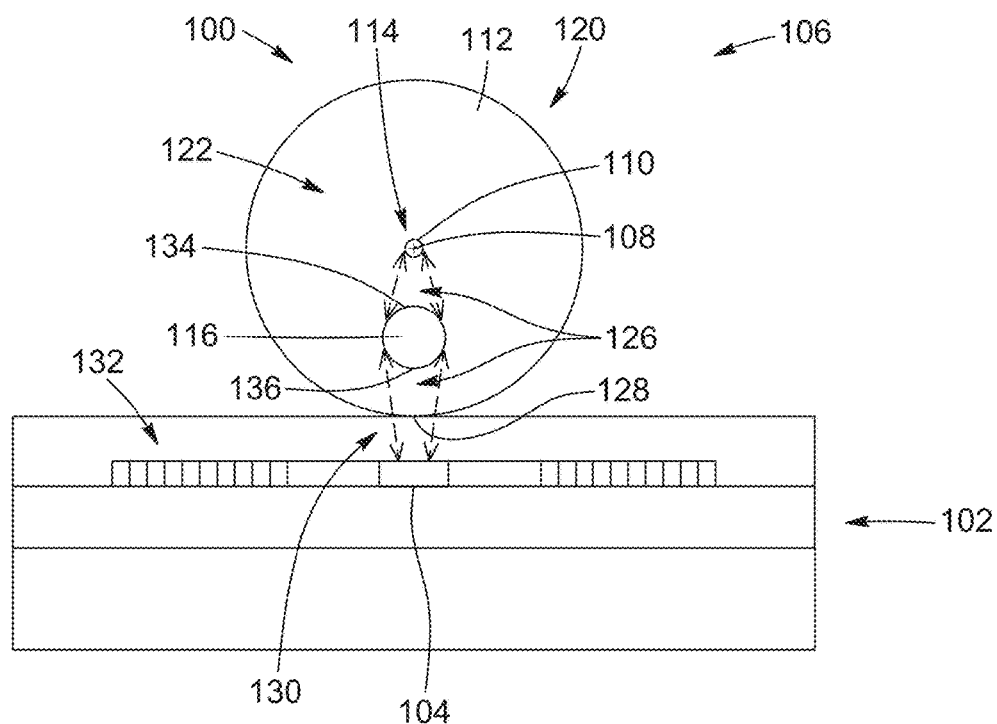

FIGS. 1A to 1C are schematic perspective, side and front views, respectively, of a possible embodiment of an optical fiber 100 for use in lateral coupling of light to and/or from another optical device. In this embodiment, the other optical device is a grating-coupled planar optical waveguide 102 including a waveguiding path 104 along which light can be guided. In this embodiment, the optical fiber 100 is disposed over and parallel to the planar optical waveguide 102, either in direct or indirect contact therewith. The optical fiber 100 and the planar optical waveguide 102 together form a coupled optical system 106.

The planar optical waveguide 102 may be part of a photonic integrated circuit, for example based on silicon-on-insulator (SOI) technology and be embodied by any appropriate type of planar waveguide structure including, but not limited to, a slab waveguide, a strip waveguide, a ridge waveguide and a rib waveguide. The planar optical waveguide 102 may include a plurality of layers stacked on a substrate, at least one of these defining the waveguiding path 104. It should be noted, however, that the optical device depicted in FIGS. 1A to 1C is provided for illustrative purposes only, and that other embodiments can use various other types of optical devices for coupling to an optical fiber such as disclosed herein.

In FIGS. 1A to 1C, the optical fiber 100 extends along a longitudinal fiber axis 108 and includes a core 110, a cladding 112 surrounding the core 110, a reflecting structure 114 inclined relative to the fiber axis 108, and a light-converging structure 116 embedded in the cladding 112. The structure, configuration and operation of these and other possible components of the optical fiber 100 will be described in greater detail below.

The core 110 is disposed in the cladding 112 to form a light-guiding path 118 along which light can be guided. Depending on the application, the core 110 may or may not be parallel to the waveguiding path 104 of the planar optical waveguide 102. The core 110 is made of a core material having a refractive index higher than the refractive index of the cladding material so that light can be guided therealong by total internal reflection at the interface between the core 110 and the cladding 112. The optical fiber 100 can have various cladding and core compositions and refractive index profiles (e.g., graded-index profile or step-index profile). For example, in some embodiments, the cladding 112 can be made of pure silica and the core 110 can be made of silica containing one or more index-changing dopants. In other embodiments, other suitable materials can be used for the cladding 112 and the core 110 (e.g., plastic, sapphire, or composite glasses). Depending on the application, the core 110 may be either single mode or multimode and may support different polarization states. In FIGS. 1A to 1C, the core 110 has a circular cross-section and is centered on the fiber axis 108, and the cladding 112 has a single-layer structure and a circular outer contour. However, in other embodiments, a non-circular and/or off-centered cores and non-circular and/or multilayer (e.g., a double-clad or triple-clad) claddings may be used. In some non-limiting embodiments, the core 110 can have a diameter ranging from about 4 µm to about 80 µm and the cladding can have a diameter ranging from about 80 µm to about 500 µm. Other core and cladding sizes can be used in other embodiments. It should be noted that, in general, the composition, cross-sectional shape and size, refractive index profile, number of cores, number of guided modes, passive or active operation mode, operating wavelength range, polarization-maintaining (PM) properties and other core properties may be varied in accordance with a specified application.

In FIGS. 1A to 1C, the optical fiber 100 terminates into an angled end or tip 120 defining a cleaved or angled endface 122. The angled end 120 includes or forms the reflecting structure 114. Depending on the application, the angled end 120 may be formed by polishing, grinding, etching, cleaving, machining or by any other suitable technique or combination of such techniques. For example, the angled end 120 may be made by an individual setup having visual recognition capabilities to ensure or help ensure that the resulting angled endface 122 is sufficiently flat and has a controlled orientation.

Figure 2:
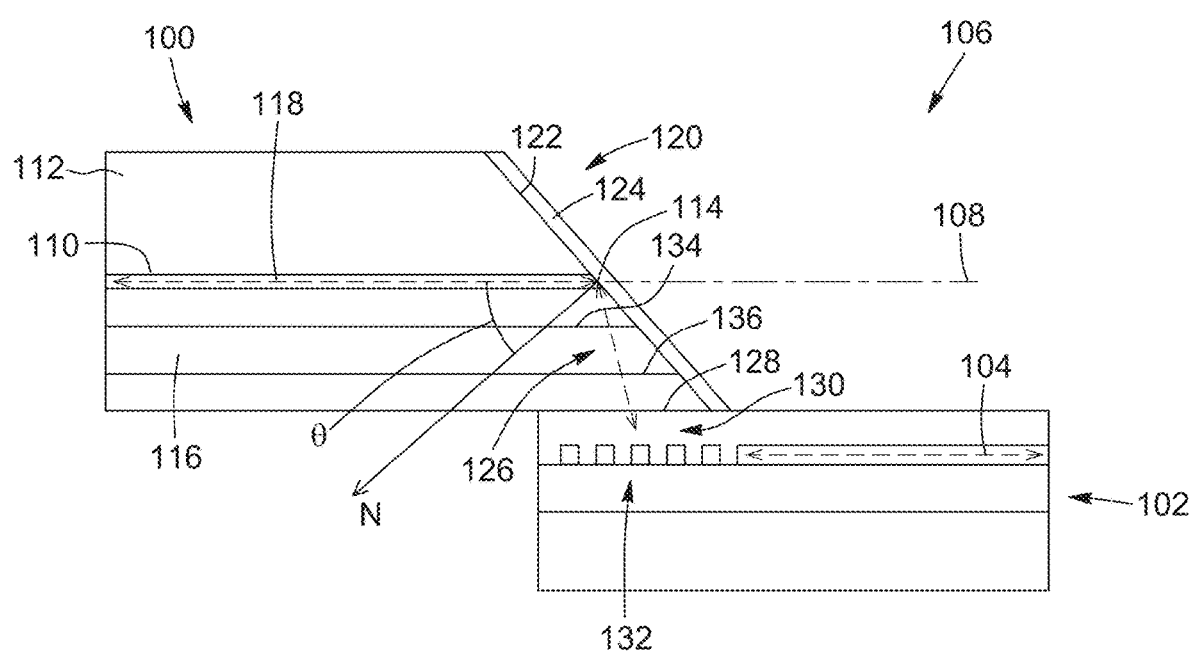
FIG. 2 is a schematic side view of a coupled optical system including an optical fiber coupled to a planar optical waveguide, in accordance with another possible embodiment.

The reflecting surface provided by the reflecting structure 114 can be substantially flat, although non-flat geometries can also be used in some applications. In some implementations, light can be reflected off the reflecting structure 114 by total internal reflection inside the core 110 for incidence angles exceeding the critical angle. Referring to FIG. 2, in another embodiment, a light-reflecting layer 124 may be deposited on the angled endface 122 to provide the reflecting structure 114. Depending on the application, the light-reflecting layer 124 can be a metallic coating (e.g., gold, silver or aluminum) or a dielectric coating. The metallic or dielectric coating can be deposited on the angled endface using various deposition techniques.

Figure 3A:
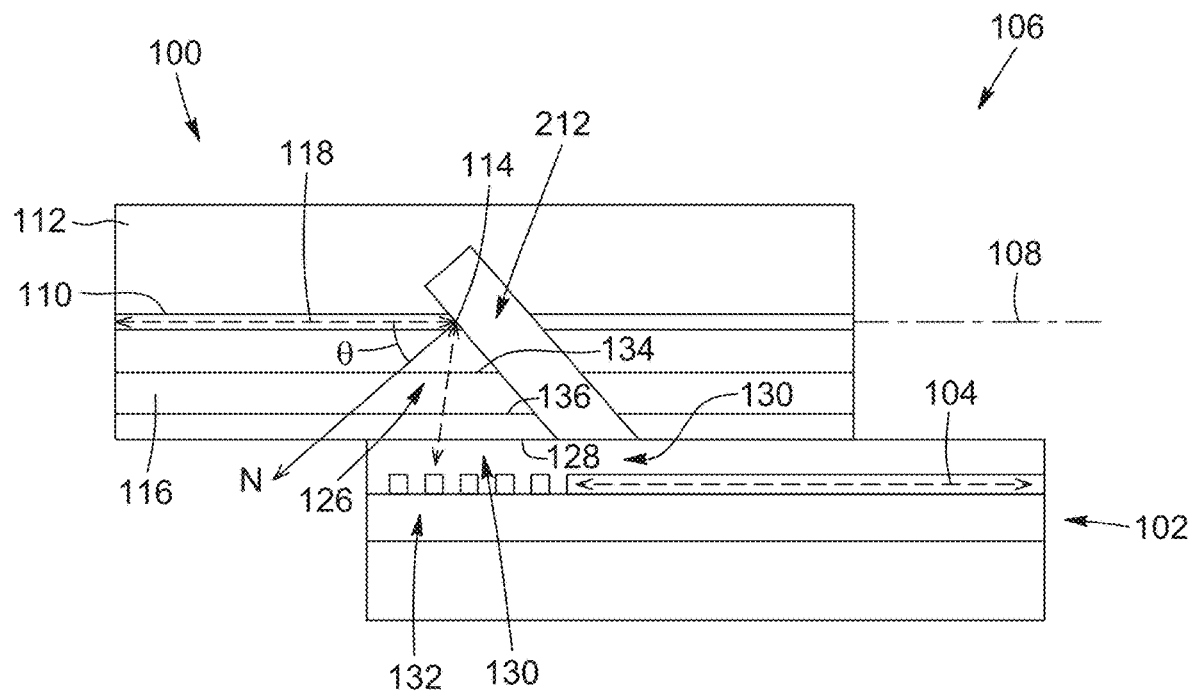
FIGS. 3A and 3B are schematic side views of a coupled optical system including an optical fiber coupled to a planar optical waveguide, in accordance with two other possible embodiments in which the reflecting structure is provided, and lateral optical coupling occurs, at an intermediate location along the length of the optical fiber.
Figure 3B:
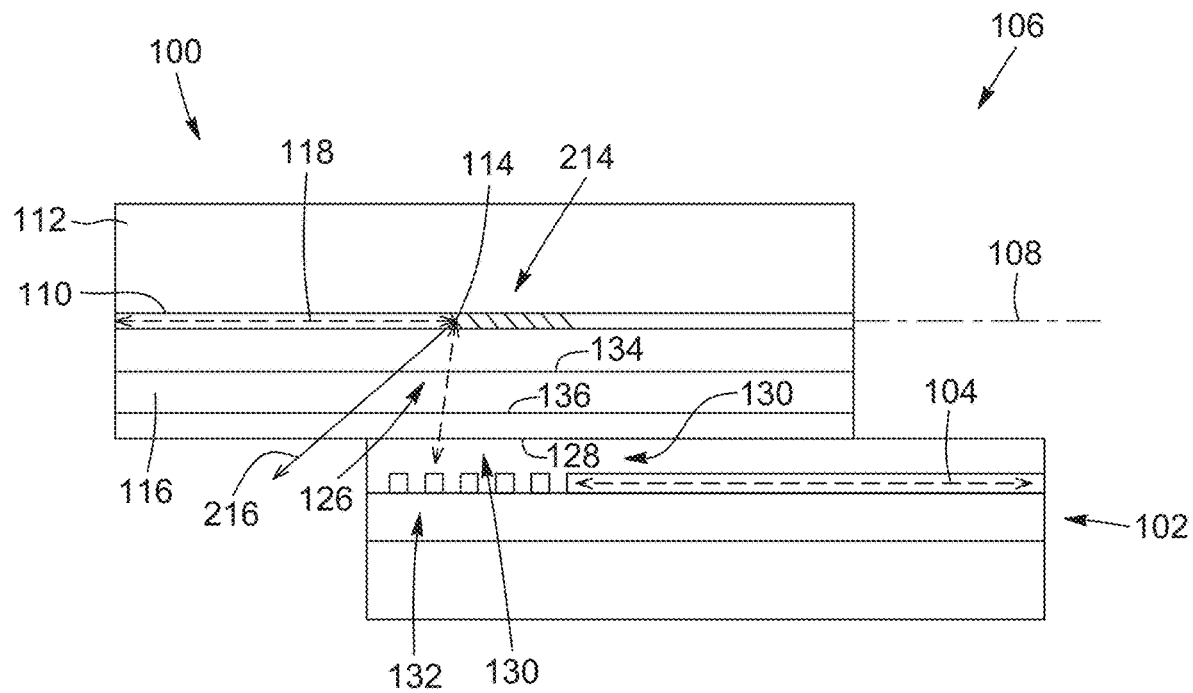

Referring to FIGS. 3A and 3B, in other variants, the reflecting structure 114 may alternatively be provided at an intermediate location between the two ends of the optical fiber 100, rather than at one of the ends. In FIG. 3A, the optical fiber 110 includes a cavity 212 formed by removing part of the cladding 112 and the core 110, for example by laser ablation, etching or mechanical processing. The cavity 212 extends through the cladding 112 and into the core 110 to form or include the reflecting structure 114. Depending on the application, the reflecting structure 114 formed by or provided in the cavity 212 may operate by total internal reflection inside the core 110 at the core-cavity interface or be provided as a reflecting layer formed at the core-cavity interface. In FIG. 3B, the reflecting structure 114 includes a tilted fiber Bragg grating 214 disposed in the core 110 with its grating axis 216 oriented at a tilt angle with respect to the fiber axis 108. For example, the tilted fiber Bragg grating 214 can be inscribed in the core 110 by conventional laser processing techniques. Depending on the application, the tilted fiber Bragg grating 214 can reflect all or only a portion of the guided core light incident thereon. Of course, in other implementations, the reflecting structure can be embodied by various optical elements or combinations of optical elements which can deflect, at least partly, the optical path of light incident thereonto. The optical elements forming the reflecting structure can include reflecting, refractive or diffracting optical elements, or a combination thereof.

Returning to FIGS. 1A to 1C, the orientation of the reflecting structure 114 can be described by an inclination angle θ defined between the normal N to a reflecting surface defined by the reflecting structure 114 and the longitudinal fiber axis 108. In some embodiments, the inclination angle 3 can range from about 30° to about 65°, although other values can be used in other embodiments. The orientation of the reflecting structure 114 may be selected so that the reflecting structure 114 reflects light incident thereon between the core 110 and a lateral coupling path 126 extending between the reflecting structure 114 and an outer lateral surface 128 of the fiber 100. The lateral coupling path 126 enables lateral coupling of light from the core 110 and toward an exterior 130 of the optical fiber 100 and/or from the exterior 130 to the core 110 of the optical fiber 100. Thus, the reflecting structure 114 can be oriented such that the orientation of the lateral coupling path 126 relative to the planar optical waveguide 102 optimizes or favors optical coupling between it and the optical fiber 100. For example, when the planar optical waveguide 102 is coupled to the optical fiber 100 by a vertical grating coupler (see below), the orientation of the reflecting structure can be selected such that the lateral coupling path 126 be tilted at an angle of between about −30° and about +30° with respect to a vertical axis perpendicular to the surface of the waveguide 102.

In the present description, the term "lateral coupling path" generally refers to a region of the optical fiber 100 along which light can travel or be coupled laterally between the core 110 and a location 130 outside of the fiber 100. Depending on the application, the lateral coupling path 126 can provide unidirectional lateral coupling, in either direction, or bidirectional coupling. That is, the lateral coupling path 126 can allow light to be coupled from the core 110 to the exterior 130 of the fiber 100, or vice versa, or both. Thus, depending on the application or use, the optical fiber 100 can provide any or all of the following types of lateral optical coupling; unidirectional coupling of light from the core 110 to the fiber exterior 130, where the reflecting structure 114 is configured to reflect light propagating in the core 110 along the light-guiding path 118 out of the core 110 and into the lateral coupling path 126 for coupling out of the optical fiber 100 and delivery to another optical device 102 or a region of interest; unidirectional coupling of light from the fiber exterior 130, for example from another optical device 102 or a region of interest, to the core 110, where the reflecting structure 114 is configured to reflect in-coupled light traveling along the lateral coupling path 126 out of the lateral coupling path 126 and into the core 110 as guided light for propagation therein; and bidirectional coupling of light between the core 110 and the exterior 130 of the fiber 100.

Figure 4:
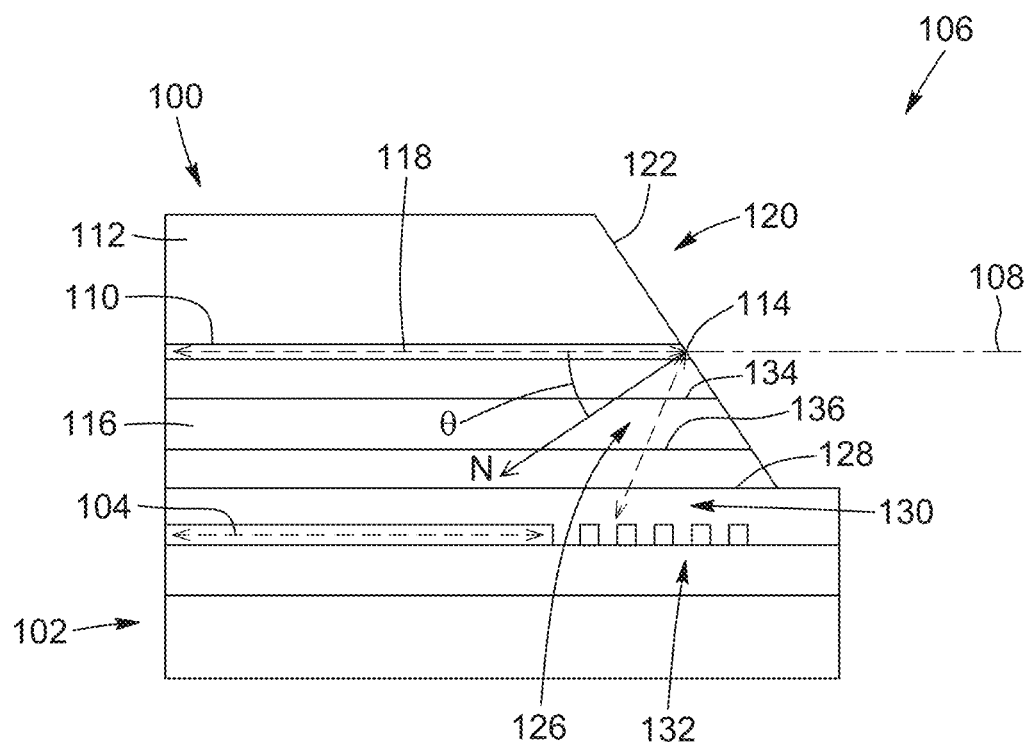
FIG. 4 is a schematic side view of a coupled optical system including an optical fiber coupled to a planar optical waveguide, in accordance with another possible embodiment.

It should be noted that the term "lateral" when referring to the lateral coupling path 126 is intended to refer to the fact that the coupling of light between the core 110 and the exterior 130 of the fiber 100 occurs through the outer lateral surface 128 of the fiber 100, rather than, for example, through an endface. It should also be noted that the lateral coupling path 126 need not be strictly perpendicular to the fiber axis 108, but may have a certain longitudinal extent, as mentioned above and depicted in FIG. 1B, Thus, depending on the angle θ between the fiber axis 108 and the reflecting plane defined by the reflecting structure 114, the longitudinal component of the wave vector of light may or may not change sign after reflection from the reflecting structure 114. This means that the direction of light propagation in the optical fiber 100 may be parallel—as depicted in FIG. 1B—or antiparallel—as in FIG. 4—to the direction of light propagation in the planar optical waveguide 102.

Referring still to FIGS. 1A to 1C, the optical fiber 100 extends over the planar optical waveguide 102 with the angled end 120 positioned such that at least part of the light coupled in and/or out of the fiber 100 via the lateral coupling path 126 is coupled in and/or out of the planar optical waveguide 102 by an optical waveguide coupler 132 disposed in the planar optical waveguide 102. In the present description, the term "optical waveguide coupler" refers broadly to an optical component configured to couple light between the optical fiber 100 and the planar optical waveguide 102, either unidirectionally, in either direction, or bidirectionally. In some implementations, the optical waveguide coupler 132 can be an optical grating structure including one or more diffraction gratings. The term "diffraction grating" generally refers herein to a structure having periodic optical properties (e.g., a refractive index profile defined by alternating grooves and ridges) that spatially modulates the amplitude and/or phase of an optical wavefront incident thereon. For example, in the illustrated embodiment, the optical waveguide coupler 132 is a vertical grating coupler disposed along the waveguiding path 104 of the planar optical waveguide 102 and configured to receive light from and/or direct light into the optical fiber 100 via the lateral coupling path 126. The general principles underlying the structure and operation of diffraction grating couplers are known in the art and need not be covered in detail herein. It should be noted, however, that the present techniques are not limited by the type and location of the optical waveguide coupler within the planar optical waveguide and that various coupling arrangements can be envisioned. For example, in some implementations, a polarization splitting grating coupler could be used.

The optical fiber 100 also includes a light-converging structure 116 embedded or disposed in the cladding 112, so as to cross the lateral coupling path 126. The light-converging structure 116 is configured to intercept and converge laterally light incident thereon and escaping from the core 110 (i.e., out-coupled light) and/or from the exterior 130 of the fiber 100 (i.e., in-coupled light).

In the present description, the term "light-converging structure" refers broadly to an optical structure configured to receive light rays propagating along the lateral coupling path and to reduce the divergence of the light rays after their passage therein or therethrough. The light-converging structure 116 of FIGS. 1A to 1C produces an output beam of reduced footprint and increased irradiance. In some implementations, the light-converging structure acts as a cylindrical lens that focuses the wavefront of the incident light predominantly along a single dimension to produce a beam having a nonsymmetric irradiance distribution, for example, a beam having an elliptically shaped irradiance profile or high astigmatism, or in the limiting case, a beam focused along a line. That is, the light-converging structure focuses light in the direction perpendicular to the fiber axis, without substantially changing light along the fiber axis.

Depending on the application, the light-converging structure 116 can include a single part or structural element embedded, incorporated or otherwise disposed in the cladding 112 along the lateral coupling path 126, or a plurality of parts or structural elements disposed at discrete, spaced-apart locations along the lateral coupling path 126. In the latter case, the multiple parts of the light-converging structure 116 are, overall, optically converging, although each individual part may be either converging, diverging or neutral. The light-converging structure 116 can act as a refractive structure or a waveguiding structure, as described in greater detail below, although reflective and diffractive structures could also be used.

Figure 5A:
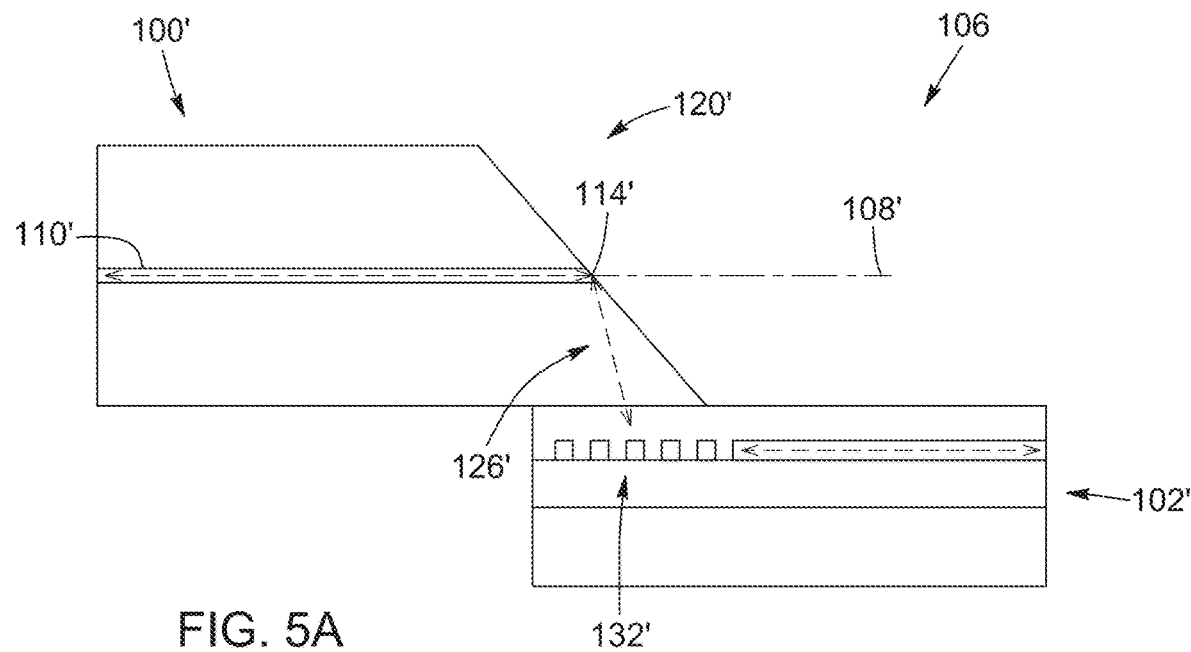
FIGS. 5A and 5B are respectively schematic side and front views of a conventional lateral fiber coupling arrangement using an optical fiber to couple light into and out of a grating-coupled planar optical waveguide.
Figure 5B:
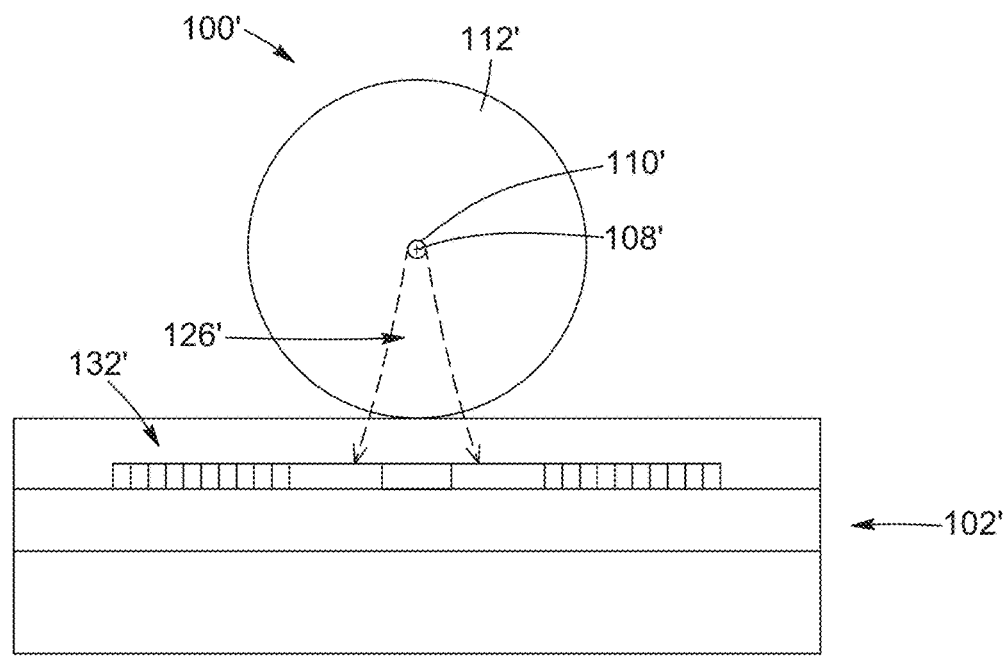

Referring to FIGS. 5A and 5B, there is shown a conventional coupling arrangement using an optical fiber 100' to couple light into and out of a grating-coupled planar optical waveguide 102'. The optical fiber 100' has a fiber axis 108' and is cleaved at an angle to form an angled end 120'. The angled end 120' acts as a reflecting structure 114' that reflects guided light propagating in the core 110' into a lateral coupling path 126' that extends through the cladding 112' and causes the reflected light to be coupled out of the fiber 100' and into an optical waveguide coupler 132'. The optical waveguide coupler 132' couples the received light into the planar optical waveguide 102' for propagation therealong. Light can also propagate in the opposite direction, from the planar optical waveguide 102', through the optical waveguide coupler 132' and the lateral coupling path 126', and into the core 110' after reflection off the reflecting structure 114'. Unlike the embodiment of FIGS. 1A to 1C, the optical fiber 100' in FIGS. 5A and 5B does not include a light-converging structure disposed along the lateral coupling path 126'. While the conventional fiber coupling technique depicted in FIGS. 5A and 5B may have certain advantages, it also has some drawbacks and limitations. One drawback is that the reflecting structure 114' reflects light incident thereon as a diverging beam of light, which can cause mode size mismatch between the optical fiber 100' and the planar optical waveguide 102' and, in turn, increased coupling losses.

Returning to FIGS. 1A to 1C, the provision of a light-converging structure 116 along the lateral coupling path 126 can enhance the efficiency of light coupling between the optical fiber 100 and the planar optical waveguide 102 by reducing the angular spread of the irradiance distribution of the laterally coupled light exiting the lateral coupling path 126, relative to when the light-converging structure 116 is absent. In some implementations, the light-converging structure 116 can be used to modify, shape or otherwise act on the wavefront of laterally coupled light propagating along the lateral coupling path 126 before it reaches the optical waveguide coupler 132 (for laterally out-coupled light) or the reflecting structure 114 (for laterally in-coupled light) to reduce or help reduce mode size mismatch and coupling losses between the optical fiber 100 and the planar optical waveguide 102. FIG. 1C schematically illustrates the converging action of the light-converging structure 116 exerted on the light propagating along the lateral coupling path 126.

In some implementations, the light-converging structure 116 may be configured to shape or condition, to a certain extent, the optical wavefront of laterally out-coupled light to match input requirements or specifications of the optical waveguide coupler 132. It may also be possible to tailor or design the optical waveguide coupler 132 to match the laterally out-coupled light corresponding to a certain light-converging structure 116. Therefore, in some implementations, both the light-converging structure 116 and the optical waveguide coupler 132 may have adjustable parameters allowing for coupling efficiency optimization and tradeoff. In some implementations, the light-converging structure 116 is located sufficiently far from the core 110 to avoid or help avoid unwanted or detrimental perturbations to the propagation of light in the core 110.

Figure 6:
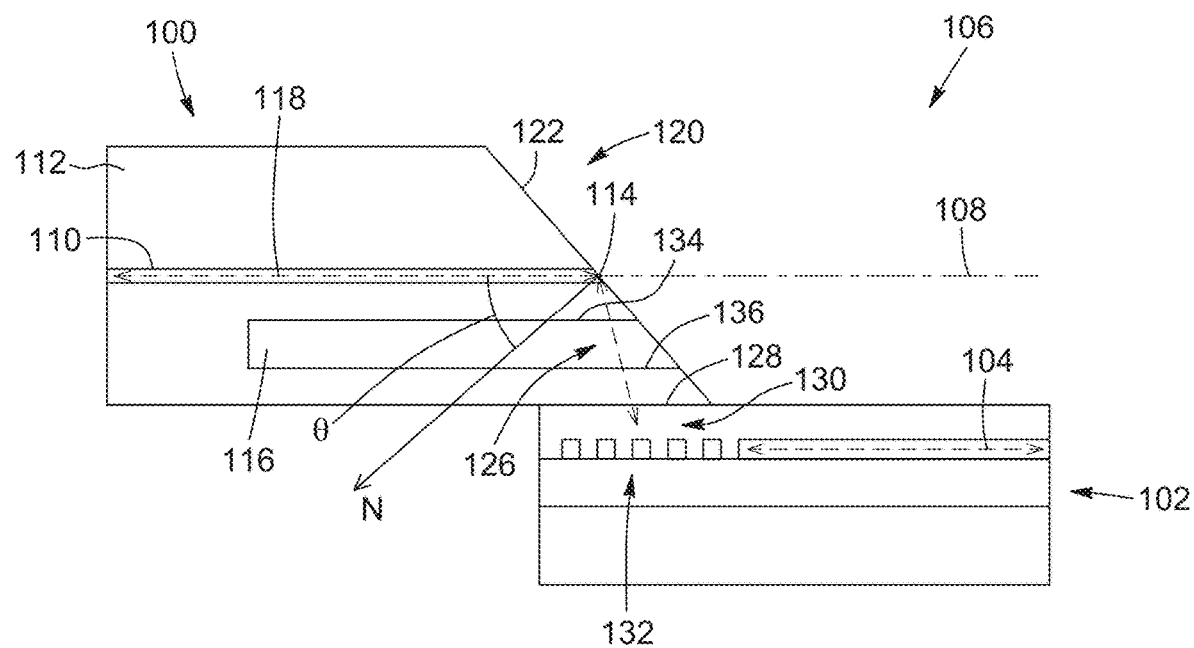
FIG. 6 is a schematic side view of a coupled optical system including an optical fiber coupled to a planar optical waveguide, in accordance with another possible embodiment.

Depending on the application, the light-converging structure 116 can be made in various shapes, geometrical dimensions, material compositions, refractive indices, spatial arrangements and orientations, numbers of separate individual parts, and the like. It should be noted that, in some instances, the term "light-converging structure" can be used interchangeably with the terms "fiber cladding modification", shortened herein as "FCM", and "fiber cladding-embedded structure". In some embodiments, the light-converging structure 116 can include one or more rod-shaped elongated insertions embedded in the cladding 112 and extending parallel or nearly parallel to, but radially offset from, the fiber axis 108. For example, in FIGS. 1A to 1C, the light-converging structure 116 is a cylindrical rod insertion. However, in other embodiments, the light-converging structure 116 may have a more limited longitudinal extent while still being within the lateral coupling path 126 to receive and converge at least a substantial or specified portion of the laterally coupled light propagating therealong, as shown in the embodiment of FIG. 6, where the light-converging structure 116 is shorter than the cladding 112.

Returning to FIGS. 1A to 1C, the light-converging structure 116 can include an inward-facing surface 134—located closer to the core 110 of the optical fiber 100—and an outward-facing surface 136—located closer to the outer lateral surface 128 of the optical fiber 100. Each of these surfaces 134, 136 can be characterized by its curvature, which may be convex, concave, flat, a combination thereof or have other geometries (e.g. parabolic, acylindrical), when viewed from the outside.

Depending on the application, the light-converging structure 116 can be made of a material having a refractive index higher, as in FIGS. 1A to 1C, or lower than the refractive index of the cladding 112. In some implementations, whether the sign of the refractive index difference between the light-converging structure 116 and the cladding 112 can determine the type of surface curvature of the light-converging structure 116. For example, each one of the inward-facing surface 134 and outward-facing surface 136 of the light-converging structure 116 can be convex or concave, when viewed from the outside, depending on whether the refractive index of the light-converging structure 116 is higher or lower, respectively, than that of the cladding 112. In some implementations, the light-converging structure 116 can have an overall convex shape when its refractive index is higher than that of the cladding and an overall concave shape when its refractive index is lower than that of the cladding. For example, in FIGS. 1A to 1C, the inward-facing surface 134 and the outward-facing surface 136 of the light-converging structure 116 are convex half-cylindrical surfaces. Of course, various other combinations of refractive index differences and surface shapes are possible and intended to fall within the scope of the present disclosure.

Referring to FIGS. 7A to 7F, there are illustrated six exemplary embodiments of an optical fiber 100 in which the light-converging structure 116 is a refractive converging element or lens configured to receive and focus light traveling along the lateral coupling path 126. The transverse cross-sectional shape of the refractive light-converging structure 116 is different in each embodiment. In FIGS. 7A to 7C, the light-converging structure 116 is made of a material having a refractive index higher than the refractive index of the cladding 110 and is shaped as a plano-convex (FIG. 7A), a biconvex (FIG. 7B) or a positive meniscus (FIG. 7C) optical element or lens. In FIGS. 7D to 7F, the light-converging structure 116 is made of a material having a refractive index lower than the refractive index of the cladding 110 and is shaped as a plano-concave (FIG. 7D), a biconcave (FIG. 7E) or a negative meniscus (FIG. 7D) optical element or lens made of a material having a refractive index lower than a refractive index of the cladding. It is noted that in FIGS. 7A to 7F, the light-converging structure 116 has no curvature along the longitudinal direction, perpendicular to the plane of the figures.

FIGS. 8A to 8D are schematic representations of example steps of a fabrication method of a possible embodiment of an optical fiber 100 including a light-converging structure 116 embedded in the cladding 112. The method usually starts with a step of providing a mother preform 138 having a core 110 and a cladding 112 (FIGS. 8A and 8B). The mother preform 138 can be formed, for example, by a modified chemical vapor deposition (MCVD) process. The method also includes a step of forming (e.g., by drilling) an off-centered, longitudinally extending hole 140 inside the mother preform 138 (FIGS. 8C and 8D), followed by a step of inserting a complementary shaped light-converging structure 116 inside the hole 140 to form a final preform 142 ready for drawing (FIGS. 8E and 8F). The light-converging structure 116 has a refractive index different from that of the cladding 112. The method further includes a step of drawing the final preform 142 to produce the optical fiber 100 including the light-converging structure 116, and a step of providing the optical fiber 100 with an angled end 120 having a reflecting structure 114 thereon (FIGS. 8G and 8H). The angled end 120 of the optical fiber 100 can be formed by cleaving, grinding or polishing the end of the optical fiber 100 at a specified angle with respect to the fiber axis. The angle is selected to control the relative orientation between the lateral coupling path and the light-converging structure 116. In some implementations, a vision alignment system can be used to ensure or help ensure that the angled end 120 of the transition optical fiber 100 is oriented at a desired or specified angle with respect to the light-converging structure 116. The optical fiber 100 has a smaller diameter and a longer length than the final preform 142, and usually the same but scaled down cross-sectional shape and geometry. The drawing step typically involves a heating process.

Various other non-limiting embodiments of optical fibers including a light-converging structure will be now presented. These embodiments may share several features with the above-described embodiments including, but not limited to, a core, a cladding, a reflecting structure, a lateral coupling path, and a light-converging structure. These features will not be described again in detail below other than to highlight differences.

Figure 9A:
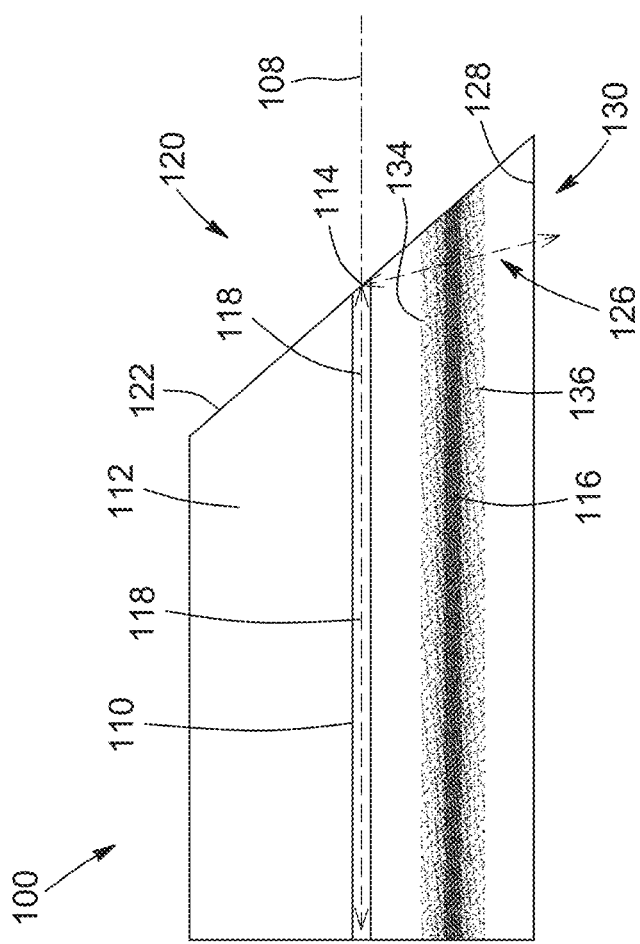
FIGS. 9A and 9B are respectively schematic side and front views of an optical fiber, in accordance with another possible embodiment. The optical fiber includes a cladding-embedded light-converging structure embodied by a graded-index (GRIN) lens rod.
Figure 9B:
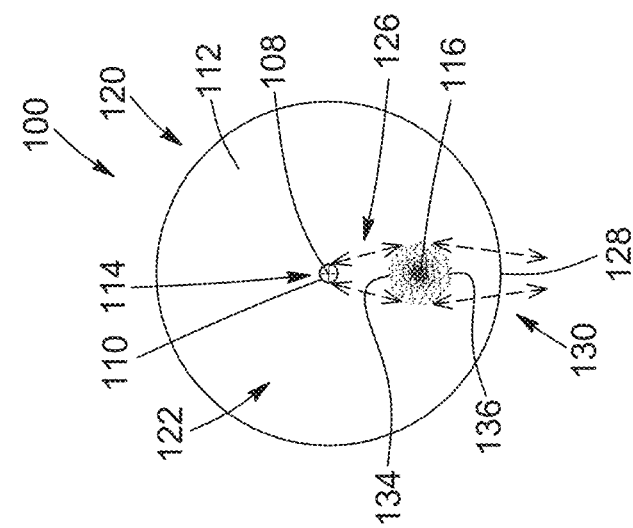

FIGS. 9A and 9B depict an embodiment of an optical fiber 100 in which the light-converging structure 116 is a cylindrical rod insertion having a higher refractive index than that of the surrounding cladding 112. This embodiment differs from that of FIGS. 1A and 10 mainly in that the rod-shaped light-converging structure 116 is made of a graded-index (GRIN) rod lens. Using a GRIN lens as the light-converging structure 116 can provide additional design flexibility.

FIGS. 10A and 10B depict a further embodiment of an optical fiber 100 in which the light-converging structure 116 includes two longitudinally extending structural elements 144a, 144b radially distributed along the lateral coupling path 126, each of which shaped as a cylindrical rod insertion. Depending on the application, the two structural elements 144a, 144b may or may not have the same cross-sectional area or the same material composition (refractive index). Using a light-converging structure 116 including a plurality of discrete structural elements 144a, 144b can provide added flexibility to tailor, engineer or otherwise control or customize the beam conditioning capabilities of the light-converging structure 116.

FIGS. 11A to 11D are schematic cross-sectional front views of four other embodiments of an optical fiber 100 including a light-converging structure 116 disposed in the cladding 112 along the lateral coupling path 126 for coupling light out of and/or into the optical fiber 100.

Figure 11A:
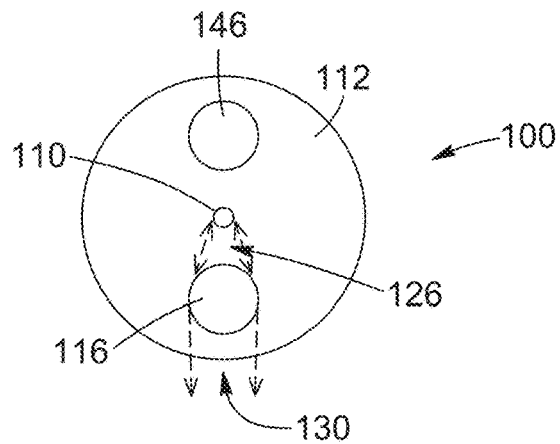
FIGS. 11A to 11D are schematic cross-sectional front views of four other possible embodiments of an optical fiber including a cladding-embedded light-converging structure and at least one other off-centered structure.

In FIG. 11A, the light-converging structure 116 is a longitudinally extending, radially offset cylindrical rod having a refractive index higher than that of the cladding 112. Of course, the light-converging structure 116 can have a different cross-sectional shape in other embodiments. The cladding 112 also hosts another rod-shaped structure 146, which is substantially identical and diametrically opposite to the light-converging structure 116. This other rod-shaped structure 146 neither intersects the lateral coupling path 126 nor is configured to perform an optical function (e.g., converging) on light to be laterally coupled in and/or out of the fiber 100. Rather, the rod-shaped structure 146 can be provided for symmetry and stress relief purposes, as without it, the lack of circular symmetry introduced by the presence of the light-converging structure 116 in the cladding 112 could cause unwanted or detrimental stress concentrations.

Figure 11B:
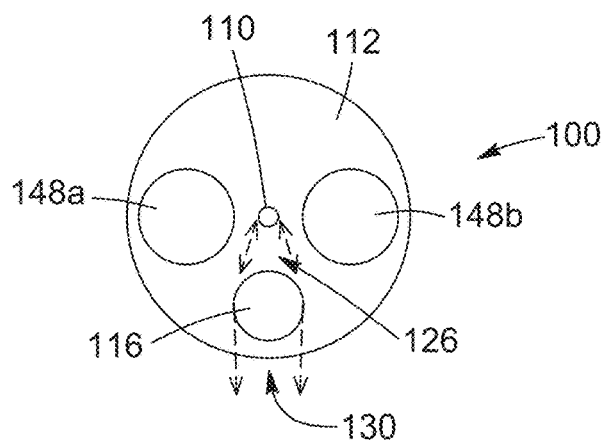

In FIG. 11B, the optical fiber 100 is a PANDA-type polarization-maintaining (PM) fiber including a pair of stress-applying parts (SAPS) 148a, 148b, each on an opposite side of the core 110 and azimuthally offset from the light-converging structure 116 (e.g., by 90° in FIG. 11B). The refractive index of the SAPs 148a, 148b is lower than that of the cladding 112. As in FIG. 11A, the light-converging structure 116 is a single, longitudinally extending, radially offset cylindrical rod having a refractive index higher than that of the cladding 112. In FIG. 11B, the line passing through the centers of the two SAPs 148a, 148b is substantially perpendicular to the lateral coupling path 126 to avoid or reduce perturbations on the lateral coupling efficiency of the fiber 100.

Figure 11C:
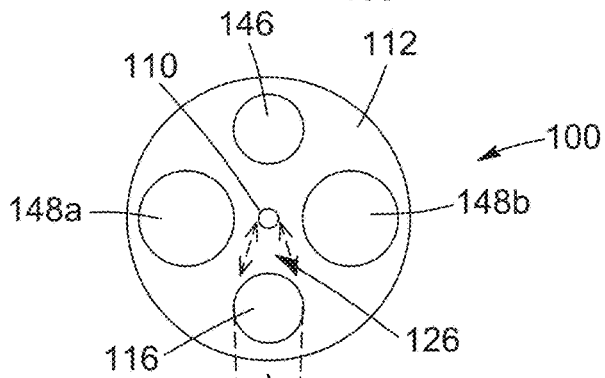

In FIG. 11C, the optical fiber 100 includes both a light-converging structure 116 and a rod-shaped structure 146 diametrically opposite thereto, as in FIG. 11A, and a pair of diametrically opposite SAPs 148a, 148b, as in FIG. 11B. In the illustrated embodiment, the diameter joining the light-converging structure 116 and the rod-shaped structure 146 is substantially perpendicular to the diameter joining the two SAPs 148a, 148b.

Figure 11D:
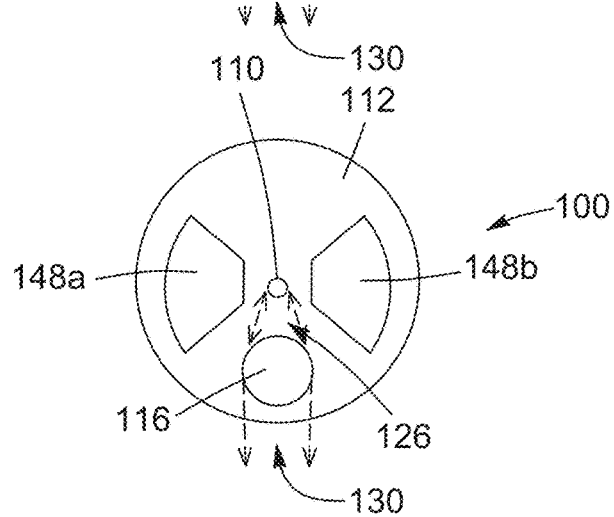

In FIG. 11D, the optical fiber 100 shares similarities with that of FIG. 11B but differs in that the shape of the SAPs 148a, 148b corresponds to that of a bow-tie-type PM fiber.

Figure 12A:
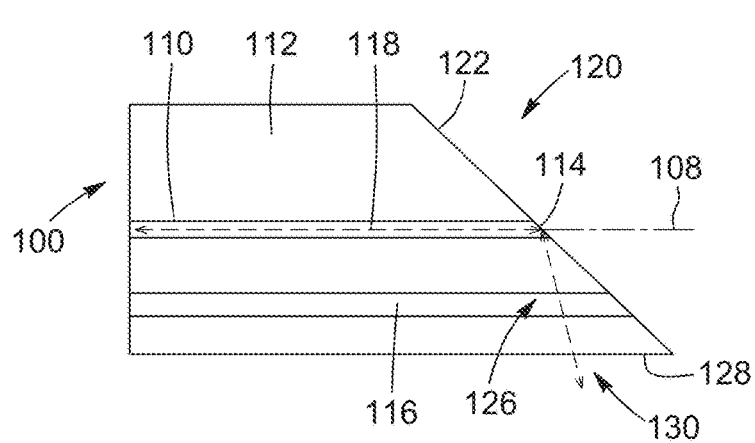
FIGS. 12A and 12B are respectively schematic side and front views of an optical fiber, in accordance with another possible embodiment. The optical fiber includes a cladding-embedded light-converging structure having an elliptical cross-section.
Figure 12B:
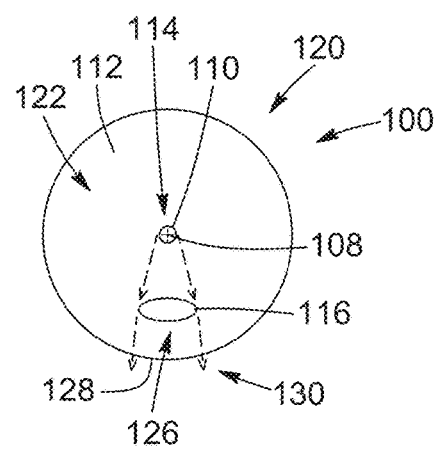
Figure 12C:
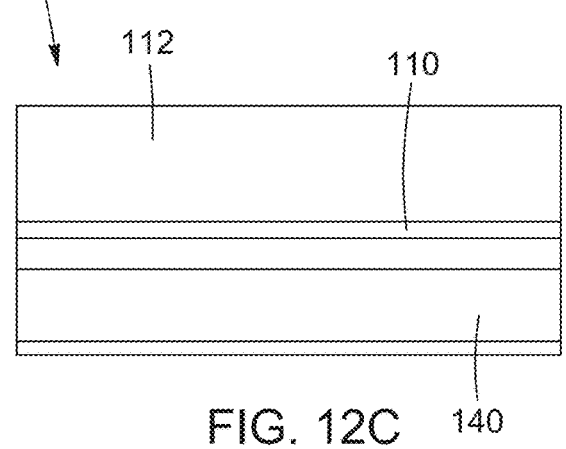
FIGS. 12C to 12F schematically depict an example of process steps for fabricating a final preform that can be drawn into the optical fiber of FIGS. 12A and 12B.
Figure 12D:
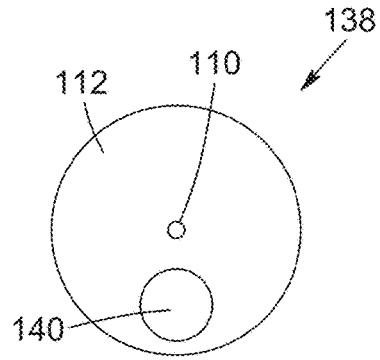
Figure 12E:
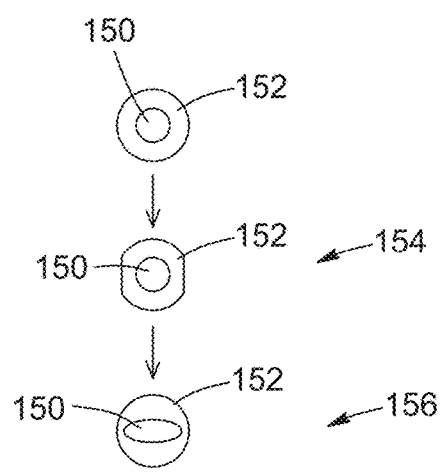
Figure 12F:
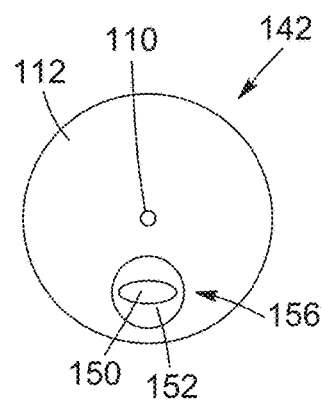

Referring now to FIGS. 12A and 12B, there are illustrated schematic side and front views, respectively, of another possible embodiment of an optical fiber 100, in which the light-converging structure 116 has an elliptical cross-section. FIGS. 12C to 12F schematically depict an example of process steps for fabricating a final preform 142 that can be drawn into the optical fiber of FIGS. 12A and 12B. The process includes a step of providing a mother preform 138 having a core 110 and a cylindrical hole 140 longitudinally drilled through the cladding 112 (FIGS. 120 and 12D). The process also includes a step of constructing a light-converging preform 150 in a separate host preform 152 having a refractive index matching that of the cladding 112 (FIG. 12E). The construction step can include steps of: depositing the light-converging preform 150 into a hole drilled in the host preform 152 (e.g., using an MCVD or rod insertion process); polishing, on two opposed sides, the host preform 152 with the light-converging preform 150 thereinside; and melting the polished structure 154 to obtain a final structure 156 in which the host preform 152 has a circular cross-section having a diameter matching the diameter of the hole 140 drilled into the cladding 112 of the mother preform 138 and the light-converging preform 142 has an elliptical cross-section. The process can further include a step of inserting the final structure 156 into the drilled hole 140 of the mother preform 138 to form the final preform 142 (FIG. 12F). The final preform 142 can then be drawn into the optical fiber 100 of FIGS. 12A and 12B.

Referring to FIGS. 13A to 13F, in some implementations, the refractive index mismatch between the light-converging structure 116 and the cladding 112 may cause unwanted or detrimental interface reflections. To address or at least alleviate these interface reflections, some embodiments may include an antireflection coating 158 deposited on at least part of the outer surface of the light-converging structure 116 in contact with the cladding 112. FIGS. 13A and 13B depict an embodiment of an optical fiber 100 including a cylindrical light-converging structure 116 having an antireflection coating 158 formed thereon. In this case, the antireflection coating 158 includes a single layer having a quarter wavelength thickness and a refractive index $n_{AR} \approx (n_{cladding} \times n_{LCS})^{1/2}$, where $n_{cladding}$ is the refractive index of the cladding 112 and $n_{LCS}$ is the refractive index of the light-converging structure 116. Of course, other configurations can be used in other embodiments. FIGS. 13C to 13F schematically depict an example of process steps for fabricating a final preform 142 that can be drawn into the optical fiber of FIGS. 13A and 13B. The process includes a step of providing a mother preform 138 having a core 110 and a hole 140 longitudinally drilled through the cladding 112 (FIGS. 13C and 13D). The process also includes a step of constructing a light-converging preform 150, starting from a separate hollow host preform 152 having a refractive index matching that of the cladding 112 (FIG. 13E). The constructing step can include steps of depositing an antireflection coating 158 on the inner wall of the hollow host preform 152, for example using MCVD, and inserting a light-converging preform 150 in the coated hollow host preform 152 to obtain a final structure 156. The process can further include a step of inserting the final structure 156 into the drilled hole 140 of the mother preform 138 to form the final preform 142 that is ready for drawing (FIG. 13F). The final preform 142 can then be drawn into the optical fiber 100 of FIGS. 13A and 13B.

Figure 14A:
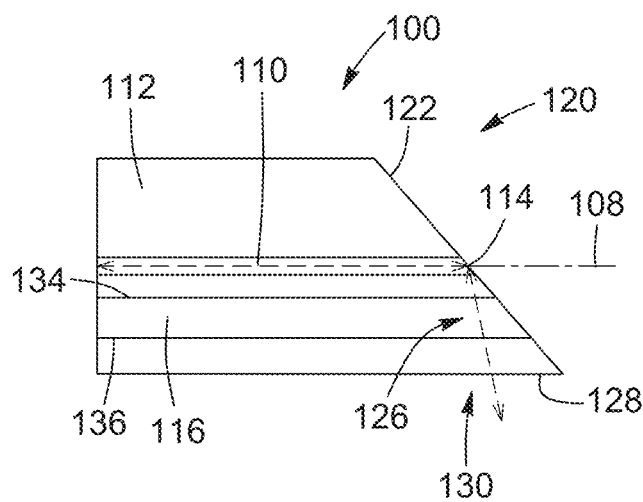
FIGS. 14A and 14B are respectively schematic side and front views of an optical fiber, in accordance with another possible embodiment. The optical fiber includes a concave-shaped light-converging structure made of a material having a refractive index lower than the refractive index of the cladding.
Figure 14B:
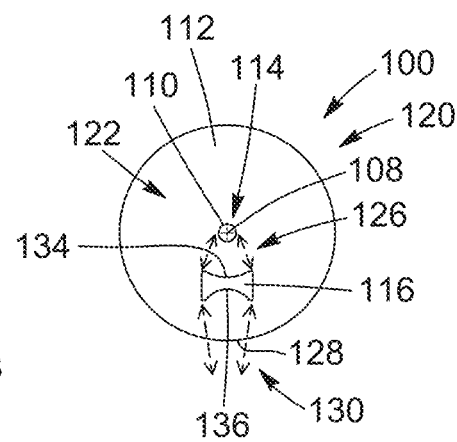
Figure 14C:
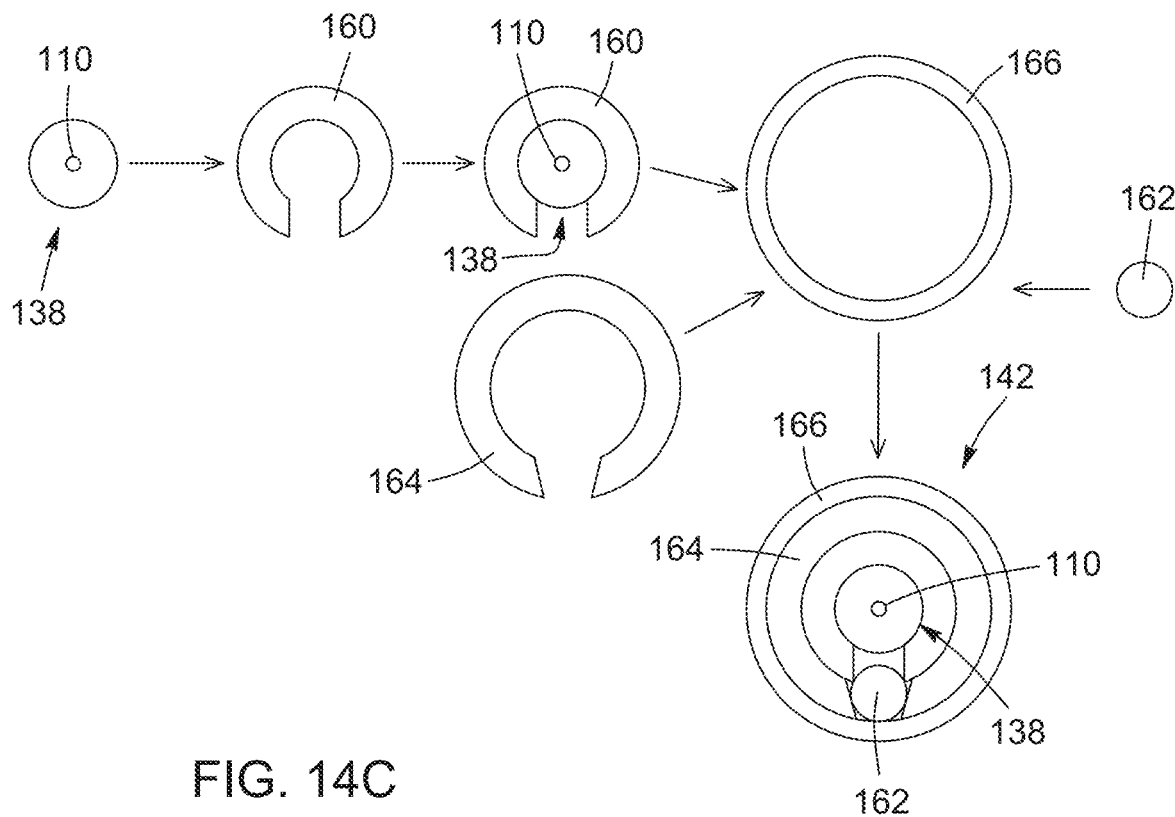
FIG. 14C schematically depicts an example of process steps for fabricating a final preform ready for drawing into the optical fiber of FIGS. 14A and 14B.

Referring to FIGS. 14A and 14B, there are shown schematic side and front views, respectively, of another embodiment of an optical fiber 100, which includes a light-converging structure 116 made of a material having a refractive index lower than the refractive index of the cladding 112. In this case, both the inward-facing surface 134 and the outward-facing surface 136 of the light-converging structure 116—the surfaces through which light traveling along the lateral coupling path 126 is transmitted—are concave when viewed from the outside. It should be noted that, in some implementations, the material forming the light-converging structure 116 can be air or another gas, in which case the light-converging structure 116 can be embodied by an air- or gas-filled hole or cavity formed in the cladding 112. FIG. 14C schematically depicts an example of process steps for fabricating a final preform 142 that can be drawn into the optical fiber of FIGS. 14A and 14B, in a case where the light-converging structure is a hollow cavity formed in the cladding. In this example, the final preform can be constructed from an assembly of various cylindrical and annular rods having refractive indices equal to that of the cladding. The construction of the assembly can proceed according to the following steps: providing a cylindrical mother preform 138 having a core 110; inserting the mother preform 138 inside a first C-shaped rod 160; and inserting the first C-shaped rod 160 with the mother preform 138 thereinside, a cylindrical rod 162, and a second, larger C-shaped rod 164 inside a hollow cylinder 166 to form a final preform 142. In the final preform 142, the second C-shaped rod 164 encloses the first C-shaped rod 160 with their gaps aligned. Furthermore, the cylindrical rod 162 is inserted in the gap of the second C-shaped rod 164, spaced from the mother preform 138 and abutting against the gap edge of the first C-shaped rod 160. The spacing between the mother preform 138 and the cylindrical rod 162 forms a hollow region that will become the light-converging structure 116 after drawing (see FIG. 14B).

Figure 15E:
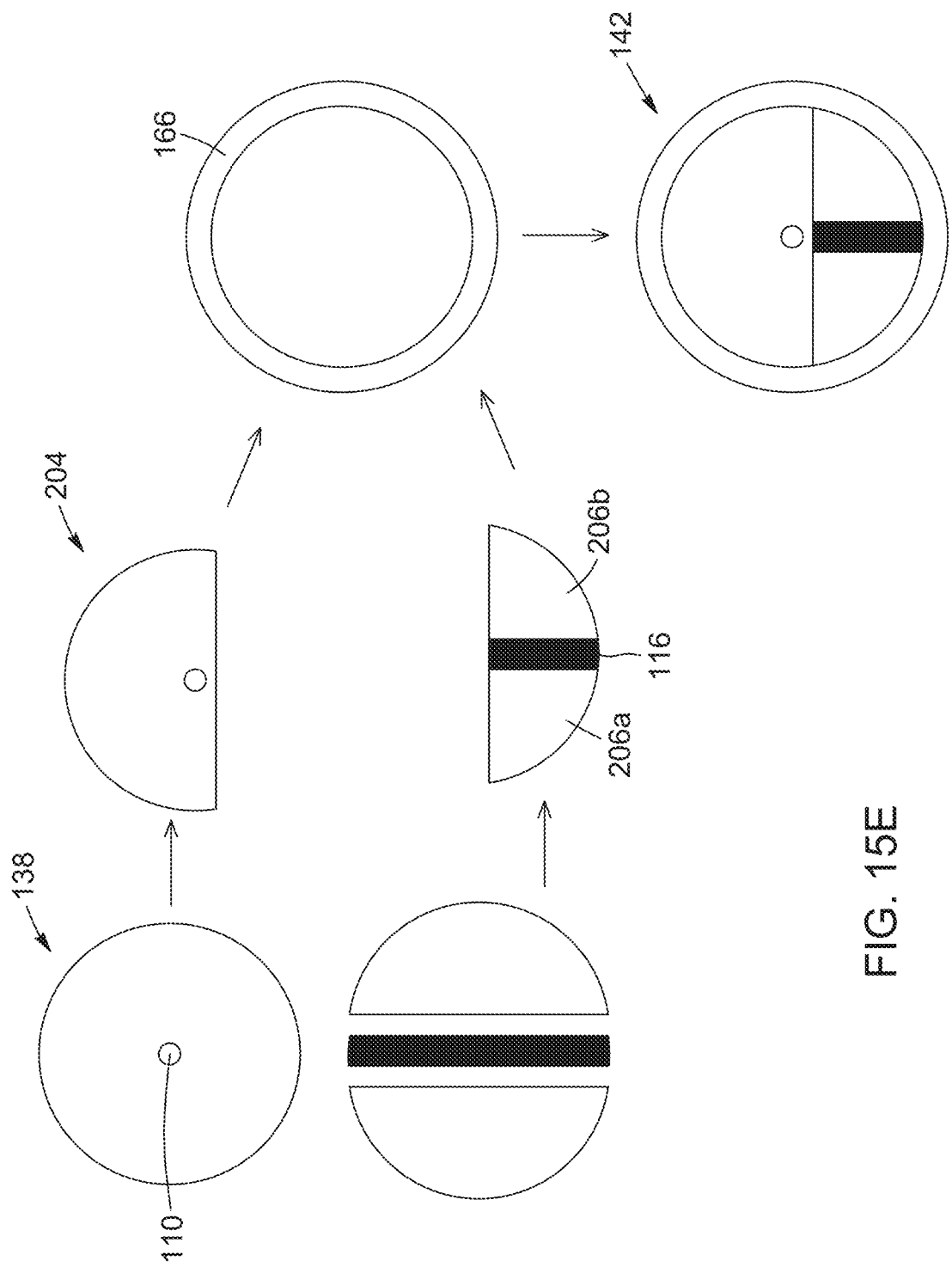
FIG. 15E schematically depicts an example of process steps for fabricating a final preform ready for drawing into the optical fiber of FIGS. 15A and 15B.

Referring to FIGS. 15A and 15B, there is shown another embodiment of an optical fiber 100 in which the light-converging structure 116 includes a waveguiding element configured to guide light therein along a waveguiding path 208 forming at least part of the lateral coupling path 126 between the core 110 and exterior 130 of the optical fiber 100. In the illustrated embodiment, the waveguiding element is a slab waveguide made of a material having a refractive index higher than that of the cladding 112. The slab extends lengthwise along the fiber axis 108 and widthwise along almost the entire length of the lateral coupling path 126 between the core 110 and the outer lateral surface 128 of the fiber 100. As depicted in FIG. 15B, in this embodiment, the slab-shaped light-converging structure 116 has a rectangular cross-section transverse to the fiber axis 108. However, other transverse cross-sectional shapes, for example tapering radially toward (FIG. 15C) or away (FIG. 15D) from the fiber axis 108, can be used in other embodiments. The light-converging structure 116 has a refractive index higher than that of the cladding 112 and acts not as a cylindrical lens, as in the embodiments described above, but as a two-dimensional slab waveguide configured to confine and guide light along the lateral coupling path 126. FIG. 15E schematically depicts an example of process steps for fabricating a final preform 142 that can be drawn into the optical fiber of FIGS. 15A and 15B. A mother preform 138 having a core 110 is polished longitudinally to obtain a polished mother preform 204 having slightly less than half of the cladding removed. The polished mother preform 204, along with a slab corresponding to the light-converging structure 116 and two rods 206a, 206b, each having an approximately quarter circular cross-section, are inserted inside a hollow cylinder 166 to form a final preform 142 that can be drawn into the optical fiber of FIGS. 15A and 15B.

Referring to FIGS. 16A and 16B, in some implementations, the optical fiber 100 can include a light-converging structure 116, in combination with modifications made to its outer lateral surface 128. For example, in the illustrated embodiment, the outer lateral surface 128 of the optical fiber 100 is polished to form a flat region 168 over a portion of its circumference azimuthally aligned with the light-converging structure 116. Alternatively, in some variants, the polishing step may be performed on the preform, prior to the drawing process. The provision of such a flat region 168 can facilitate alignment and/or bonding of the optical fiber 100 to another optical device to which the optical fiber 100 is to be coupled. It can also reduce the length of the lateral coupling path 126 to improve optical coupling efficiency between the optical fiber 100 and the other optical device.

Figure 17A:
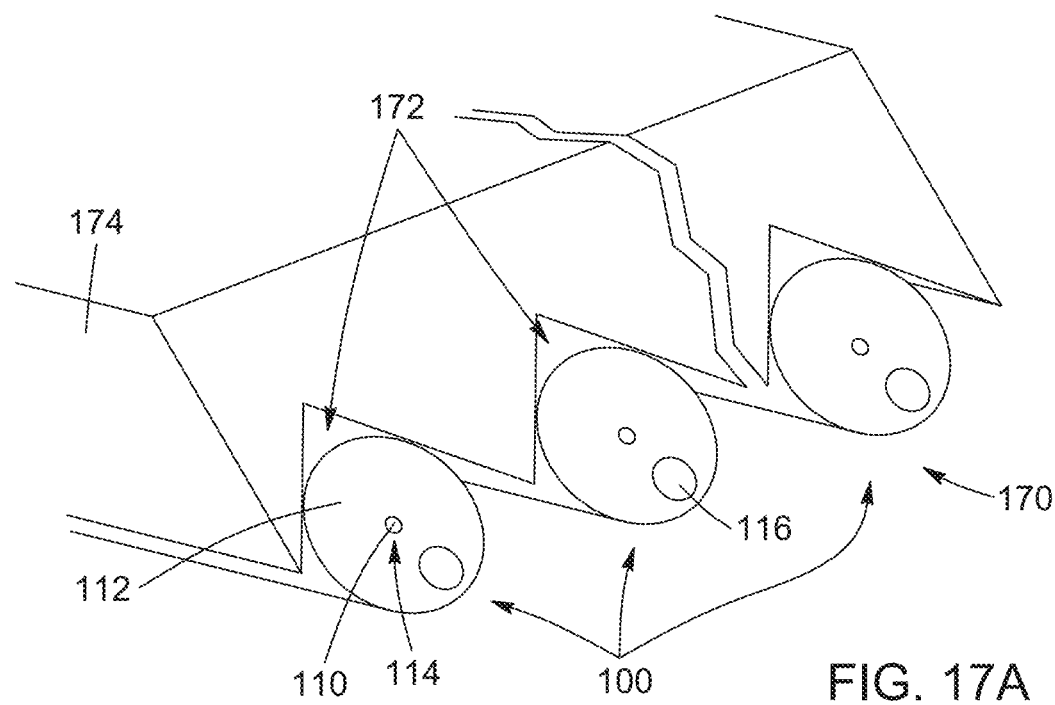
FIGS. 17A and 17B are respectively schematic perspective and front views of an array of optical fibers, in accordance with an embodiment, in which the optical fibers are received and held in a V-groove support structure.
Figure 17B:
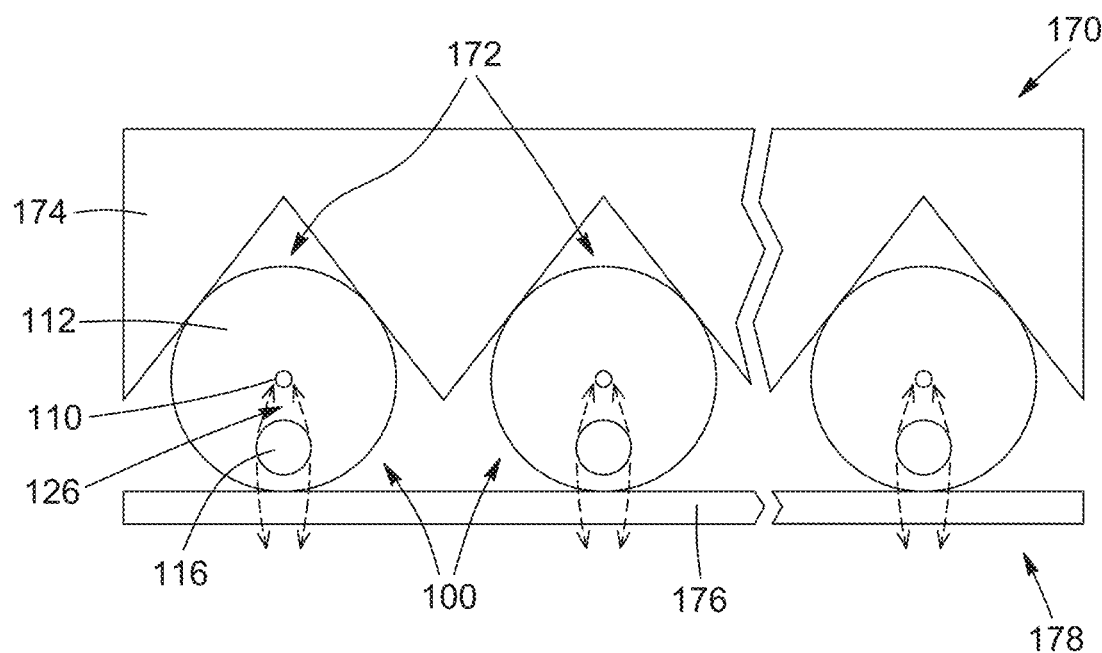

Referring now to FIGS. 17A and 17B, there is illustrated an embodiment in which a plurality of optical fibers 100 such as disclosed herein are arranged in a linear array 170. For example, in the illustrated embodiment, the plurality of optical fibers 100 are received in corresponding V-grooves 172 of a V-groove support structure 174, in a parallel, side-by-side and spaced-apart relationship. The provision of the V-groove support structure 174 can ensure or facilitate positioning and alignment of the optical fibers 100. As shown in FIG. 17B, a lid cover 176 can be provided over the optical fibers 100 received in the V-groove support structure 174. The lid cover 176 and the V-groove support structure 174 can form a housing 178 around the optical fiber array 170. The effect of the lid cover 176 on mode size mismatch and coupling efficiency can be accounted and compensated for by proper design of the light-converging structure 116. Depending on the application, the fibers 100 can be cleaved or polished either prior to or after being mounted on the V-groove support structure 174.

Figure 18A:
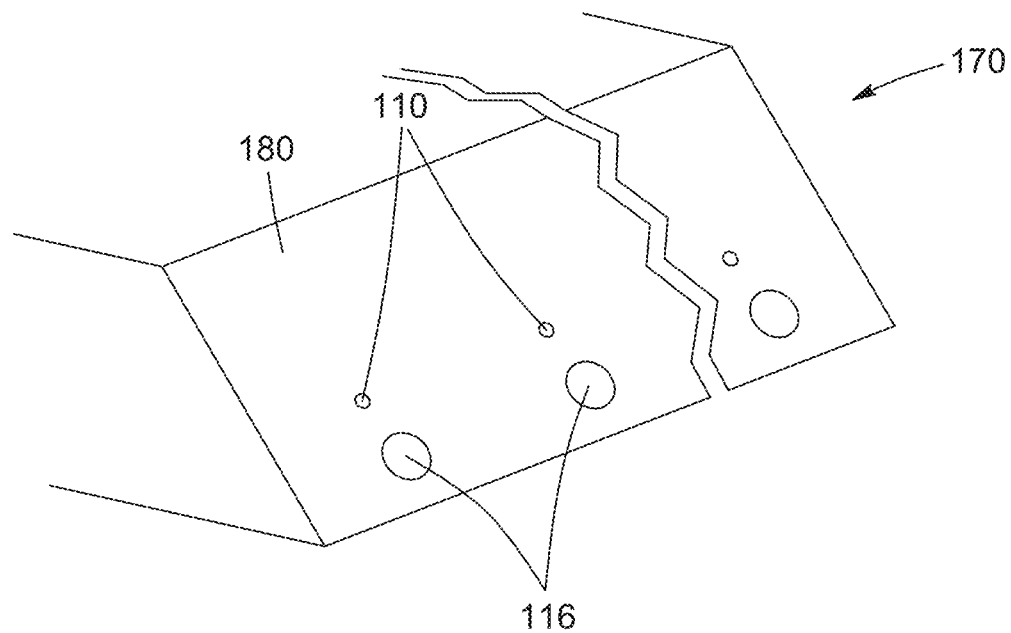
FIGS. 18A and 18B are respectively schematic perspective and front views of an array of optical fibers, in accordance with another embodiment. in which the optical fibers are hosted in a common, rectangular prismatic cladding having an angled endface.
Figure 18B:
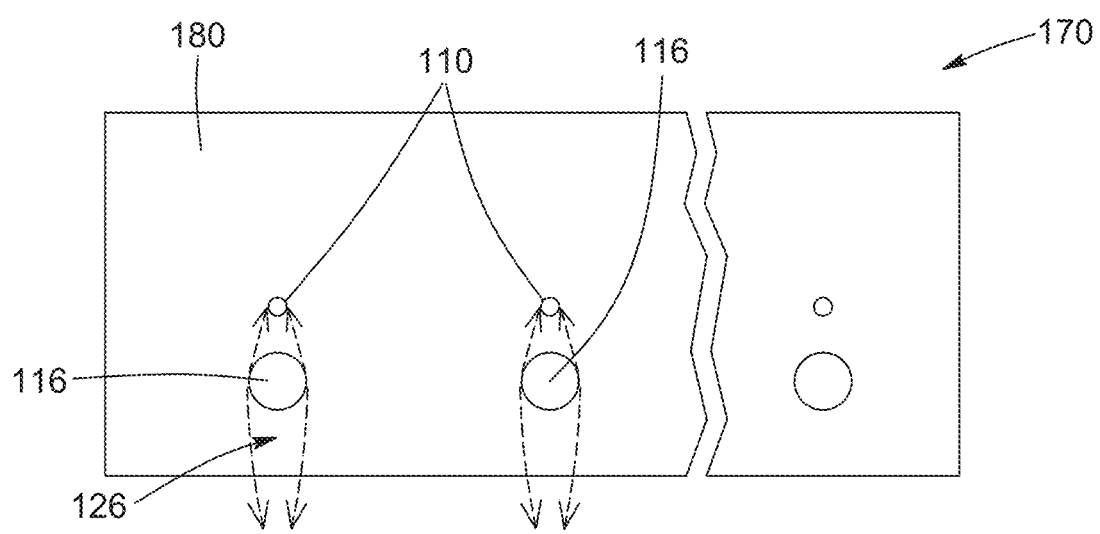

Turning to FIGS. 18A and 18B, in a variant, the array 170 of optical fiber 100 can be hosted in a common cladding 180 to avoid the use of a separate support structure as in FIGS. 17A and 17B. In FIGS. 18A and 18B, the common cladding 180 is shaped as a rectangular prism having flat surfaces that can facilitate alignment and bonding to optical devices to which the optical fibers 100 are intended to be coupled. The embodiment of FIGS. 18A and 18B can be fabricated by using a rectangular prismatic base preform having a plurality of holes formed therein to receive a corresponding plurality of final preforms such as the one illustrated in FIGS. 8E and 8F. In some implementations, the common cladding 180 and the cores 110 and light-converging structures 116 embedded therewithin can be cleaved or polished after the drawing process.

Figure 19:
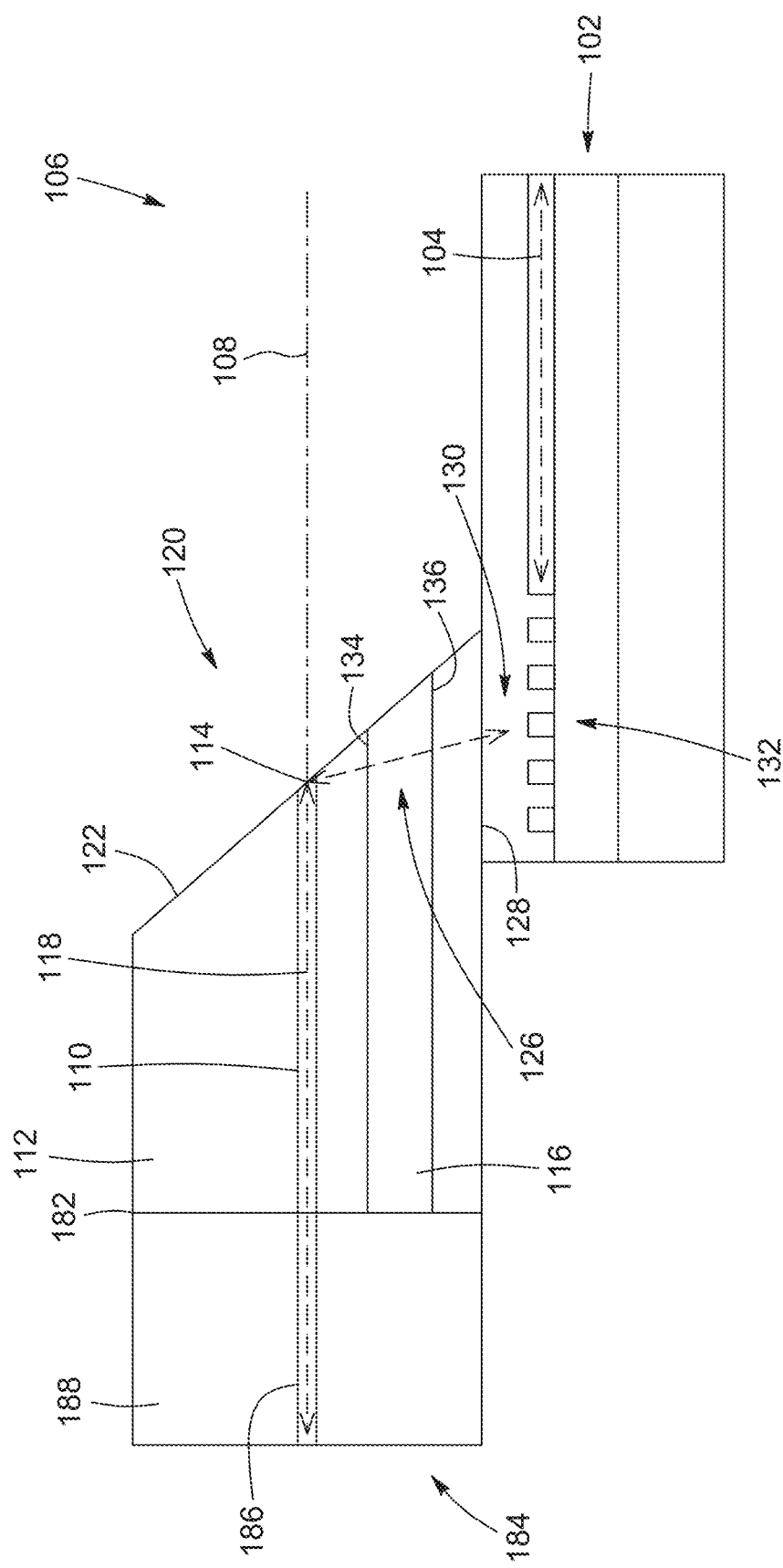
FIG. 19 is a schematic side view of a fiber-optic transition coupled between a main optical fiber and a grating-coupled planar optical waveguide, in accordance with a possible embodiment.

Referring now to FIG. 19, there is shown another exemplary embodiment of an optical fiber 100 for use in lateral coupling of light into and/or out of a planar optical waveguide 102 of a photonic integrated chip. The optical fiber 100 is disposed over and parallel to the planar optical waveguide 102, either in direct or indirect contact therewith. The optical fiber 100 has an angled end 120, that includes the reflecting structure 114, and a fiber-coupling end 182 opposite to the angled end 120. The embodiment of FIG. 19 shares many features with the embodiment of FIGS. 1A to 1C but differs mainly in that the optical fiber 100 is a relatively short fiber segment and operates as a fiber-optic transition coupler for coupling light between a main optical fiber 184, via the fiber-coupling end 182, and the planar optical waveguide 102, via the lateral coupling path 126 at the angled end 120. In some implementations, the main optical fiber 184 can be a conventional or standard single-mode fiber, for example a Corning SMF-28™ fiber. The main optical fiber 184 includes a core 186 and a cladding 188 surrounding the core 186. In such implementations, the optical fiber 100 having the angled end 120 and the light-converging structure 116 can be referred to as a "transition optical fiber", a "fiber-optic transition coupler", a "fiber-optic transition device", or simply a "fiber-optic transition" to denote its role in coupling light from a "main" optical fiber 184 to another optical device, or vice versa, such as a grating-coupled planar optical waveguide 102. In FIG. 19, the main optical fiber 184, the grating-coupled planar optical waveguide 102 and the transition optical fiber 100 connected therebetween together form a coupled optical system 106.

In some implementations, the main optical fiber 184 and the transition optical fiber 100 can be connected to each other using a fusion splicing process. In other implementations, the optical fiber 184 and the transition optical fiber 100 can be abutted to each other, for example by using mechanical optical fiber connectors such as MPO connectors. In some implementations, the presence of the light-converging structure 116 may weaken or otherwise affect the mechanical strength of the connection between the main optical fiber 184 and the transition optical fiber 100, especially when the light-converging structure 116 consists of a hole or cavity formed in the cladding 112. In such implementations, further or more specific mechanical strengthening or splicing can be used in the connection region, if needed.

FIGS. 20A to 20D schematically depict an example of process steps for assembling a coupled optical system in which a main optical fiber is coupled to a grating-coupled planar optical waveguide via a transition optical fiber such as disclosed herein and including an angled end and a light-converging structure. In one assembly scenario, the planar optical waveguide is provided in a photonic integrated chip that is already mounted into its final end-user package. In typical vertical fiber-to-chip coupling assemblies, the fiber may require to be precisely positioned over the diffraction grating disposed in or on the planar optical waveguide. For example, common position tolerances can be ±2 μm in the chip plane for 1 dB penalty losses.

Figure 20A:
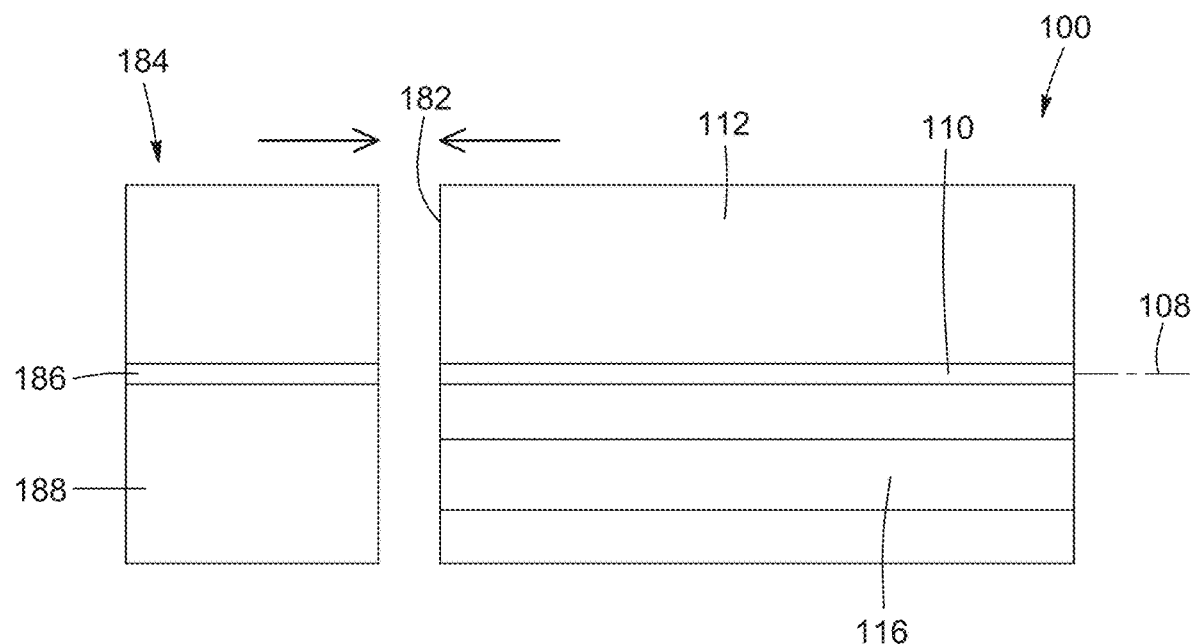
FIGS. 20A to 20D are schematic representations of an example of process steps for assembling a coupled optical system in which a main optical fiber is coupled to a grating-coupled planar optical waveguide via a transition optical fiber including an angled end and a cladding-embedded light-converging structure.

Referring to FIG. 20A, the assembly process can include a step of connecting a main optical fiber 184 to a fiber-coupling end 182 of a transition optical fiber 100 having a cladding-embedded light-converging structure 116. The connection can be achieved by fusion splicing or using optical fiber connectors. In some implementations, the transition optical fiber 100 can have a relatively small length, for example between 0.1 cm and 100 cm. The transition optical fiber 100 may, but need not, have the same core and cladding dimensions as the main optical fiber 184 to facilitate connection therewith. More particularly, if the main optical fiber 184 is a PM fiber having SAPs, the SAPs can be oriented relative to the light-converging structure 116 of the transition optical fiber 100 using a conventional splicing system.

Figure 20B:
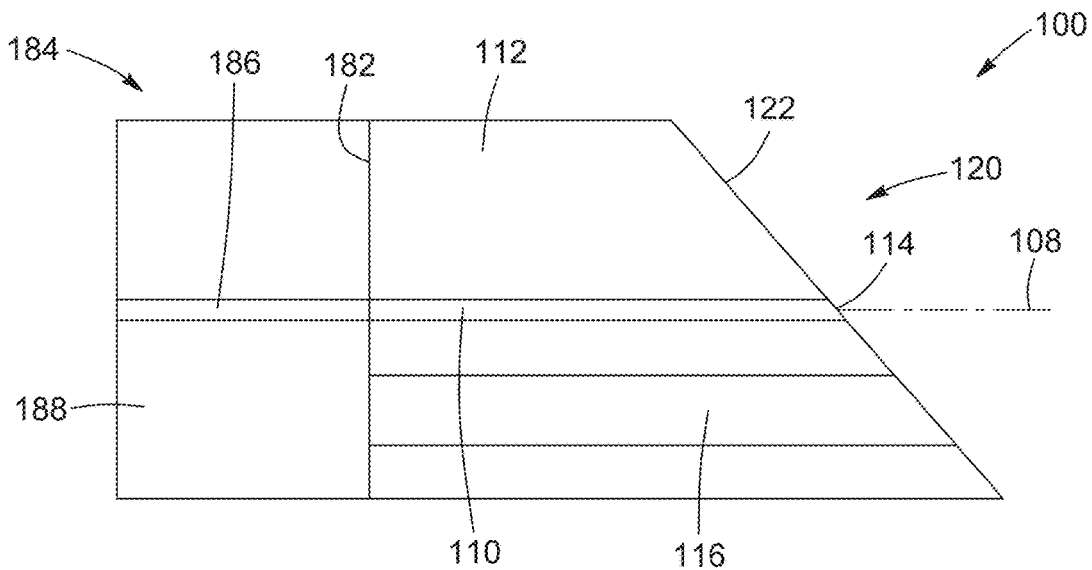

Referring to FIG. 20B, the assembly process can include a step of cleaving or polishing the end of the transition optical fiber 100 opposite the fiber-coupling end 182 to form an angled end 120 making a specified angle with respect to the fiber axis 108. The angle is selected to control the relative orientation between the lateral coupling path and the light-converging structure 116. In some implementations, a vision alignment system can be used to ensure or help ensure that the angled end 120 of the transition optical fiber 100 is oriented at a desired or specified angle with respect to the light-converging structure 116.

Figure 20C:
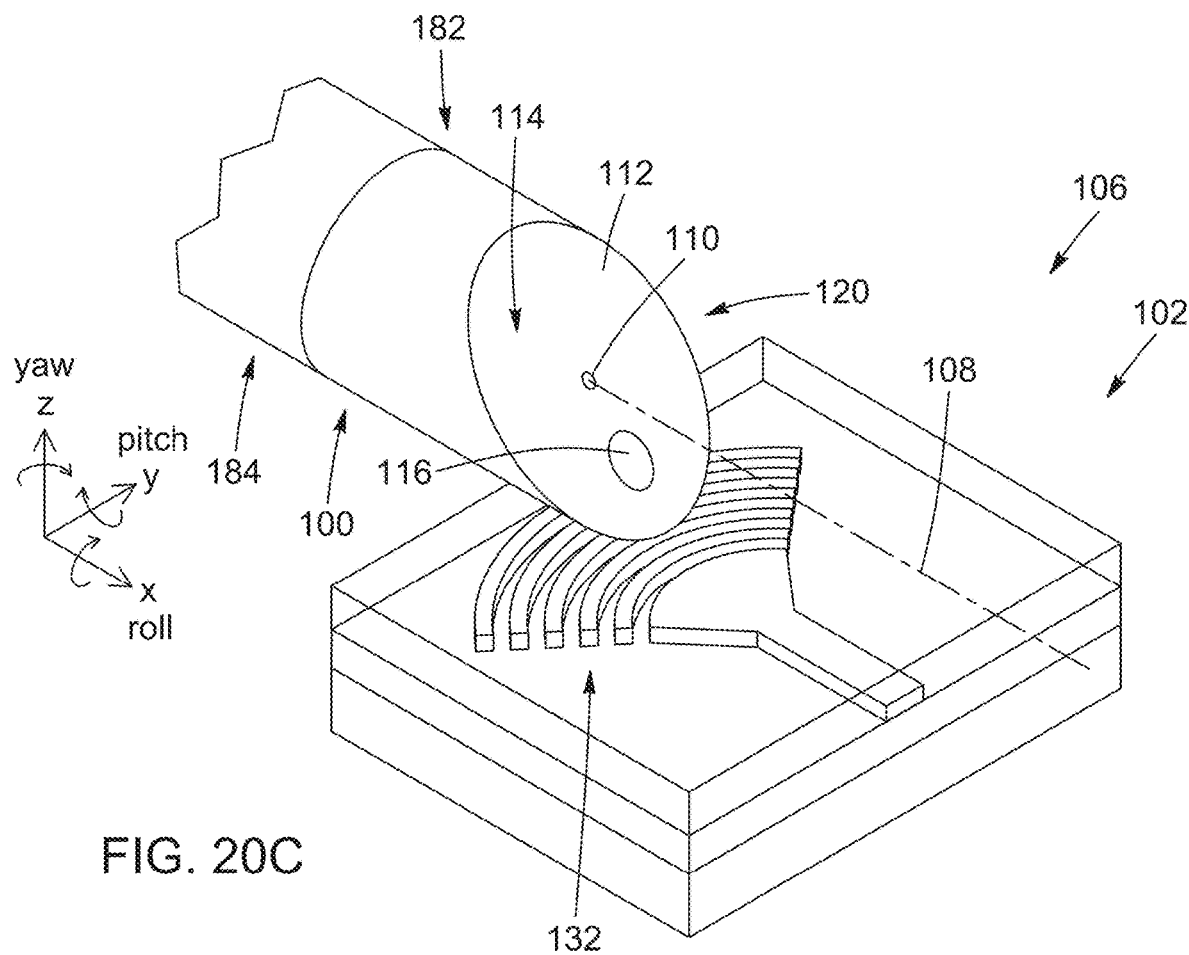

Referring to FIG. 20C, the assembly process can include a step of aligning the transition optical fiber 100 with respect to the vertical diffraction grating coupler 132 disposed in or on the planar optical waveguide 102 prior to permanent bonding. The transition optical fiber 100 can be moved in six degrees of freedom. For example, the alignment can be performed with the aid of reference fiducial markers or a pattern recognition method. In some implementations, an active scanning method can also or alternatively be used, in which light is launched into the system at one end and coupling efficiency is detected at another end, for example using an integrated photodetector, a loopback-type waveguide coupled to an external detector, or back reflections coupled back into the injecting fiber.

Figure 20D:
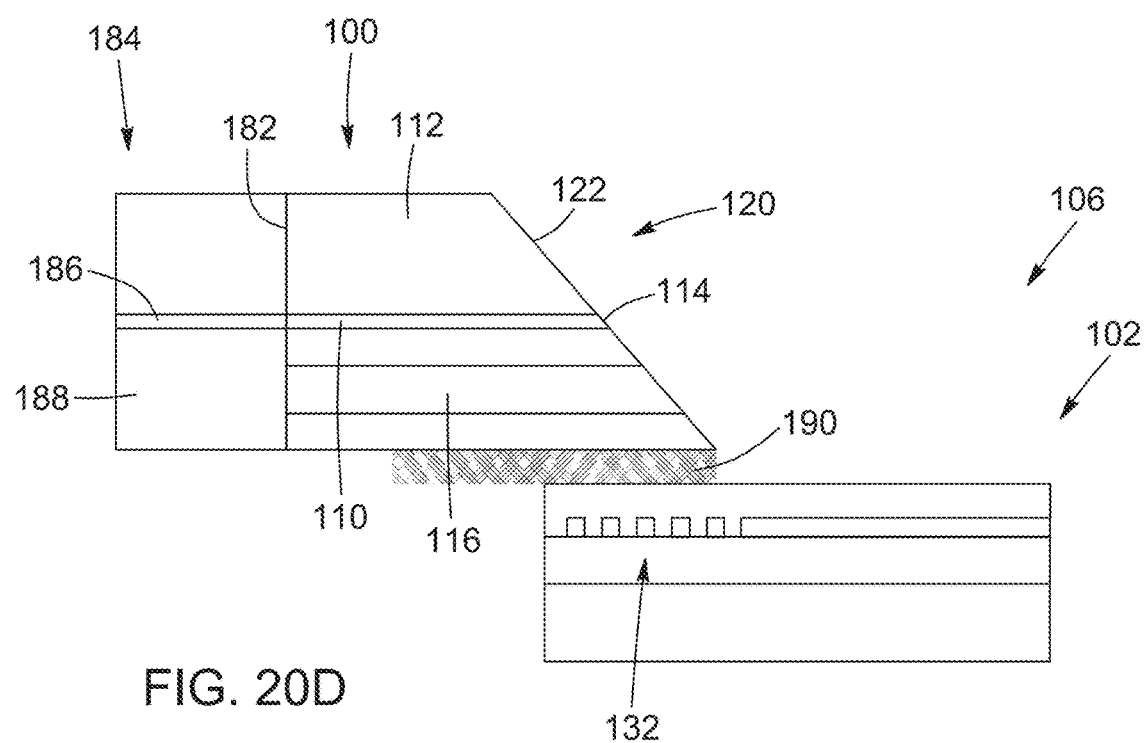

Referring to FIG. 20D, the assembly process can include a step of permanently bonding the transition optical fiber 100 to the surface of the planar optical waveguide 102. Usually, the surface of the planar optical waveguide 102 is made of a conformal cladding material such as $SiO_2$ deposited on top of a silicon waveguiding structure forming the waveguiding path 104 and an optical waveguide coupler 132. In some implementations, the bonding material can be an adhesive 190, for example epoxy, having a matching refractive index close to $SiO_2$ and being transparent in the operating wavelength band. The adhesive 190 can be cured with ultraviolet (UV) radiation. In other scenarios, the adhesive 190 may be cured using a thermal process or both a thermal process and UV radiation. In some implementations, the bond line thickness remains small (e.g., around or less than 10 µm) and can be accounted for in the design of the light-converging structure 116.

Figure 20E:
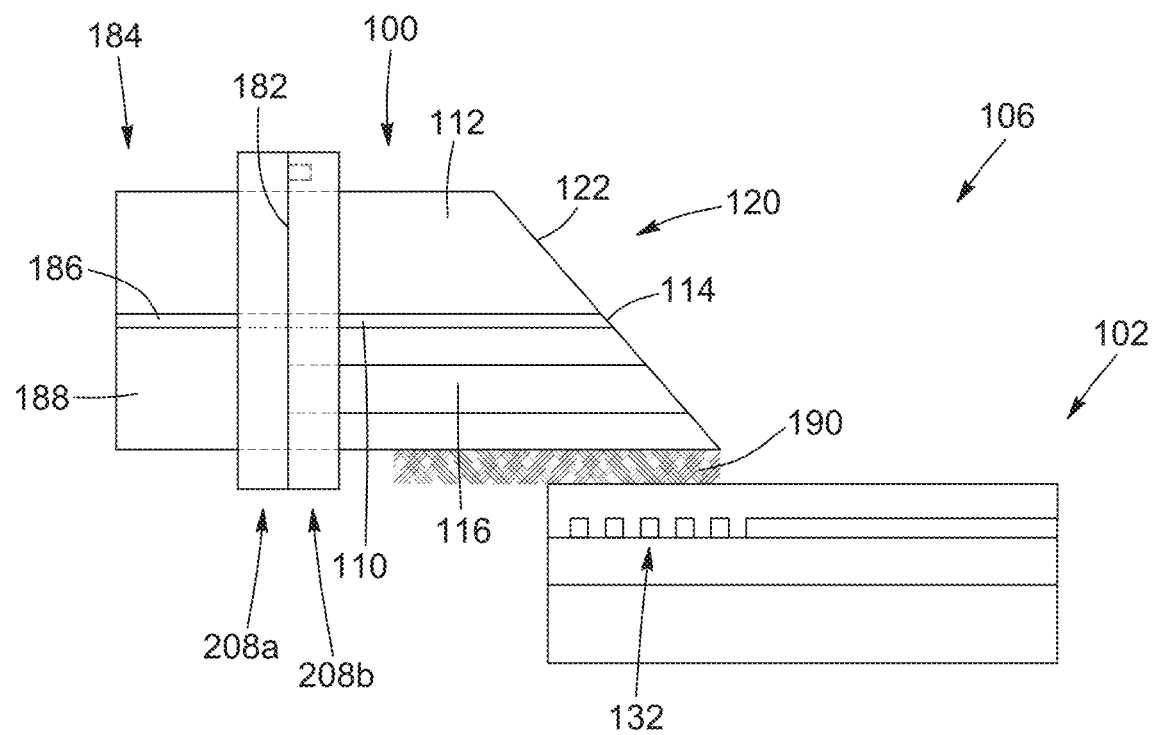
FIG. 20E is a variant in which the transition optical fiber and the main optical fiber are connected to each other by mechanical fiber connectors.

Referring to FIG. 20E, there is illustrated an embodiment in which the main optical fiber 184 and the transition optical fiber 100 are connected to each other via respective fiber-optic connectors 208a, 208b, which may be MPO connectors. In the illustrated embodiment, the connector 208a connected to the main optical fiber 184 is a male connector and the connector 208b connected to the transition optical fiber 100 is a female connector, although the reverse configuration is possible in other embodiments.

Referring to FIG. 21, computer simulations were performed to illustrate features and advantages of the fiber-based coupling techniques disclosed herein. The table of FIG. 21 compares the lateral coupling efficiency of three embodiments of an angled optical fiber with a cladding-embedded light-converging structure and a conventional angled optical fiber without such a light-converging structure. The three simulated embodiments correspond substantially to the optical fiber illustrated in FIGS. 1A to 1C (refractive light-converging structure made of a material having a refractive index higher than that of the cladding); 14A and 14B (refractive light-converging structure made of a material having a refractive index lower than that of the cladding); and 15A and 15B (light-converging structure operating as a two-dimensional slab waveguide). The conventional angled-tip optical fiber corresponds substantially to that illustrated in FIGS. 5A and 5B. In each case, the optical fiber is coupled to a silicon waveguide via a focusing vertical grating coupler (thickness: 220 nm; width: 500 nm; buried oxide refractive index: 1.444).

The computer simulations were performed using a three-dimensional (3D) finite difference time domain (FDTD) method to solve Maxwell's equations in three dimensions. The parameters used in the simulations have standard values currently used in silicon-based integrated photonic technology. The fiber cladding refractive index was set to 1.445 for all the simulations, which matched the refractive index of the top fused silica cladding of the silicon photonic integrated circuit. The simulated optical coupling efficiency corresponds to the ratio of the power launched into the core of the main fiber to the power coupled and guided in the silicon waveguide. The results in FIG. 21 indicate that the three simulated embodiments including a cladding-embedded light-converging structure can achieve coupling efficiencies ranging from 38% to 40%, compared to the coupling efficiency of 33% obtained for the conventional configuration without such a light-converging structure.

As mentioned above, the optical fiber disclosed herein can be used not only in grating-based vertical coupling configurations. Some possible examples of other configurations are presented below.

Figure 22A:
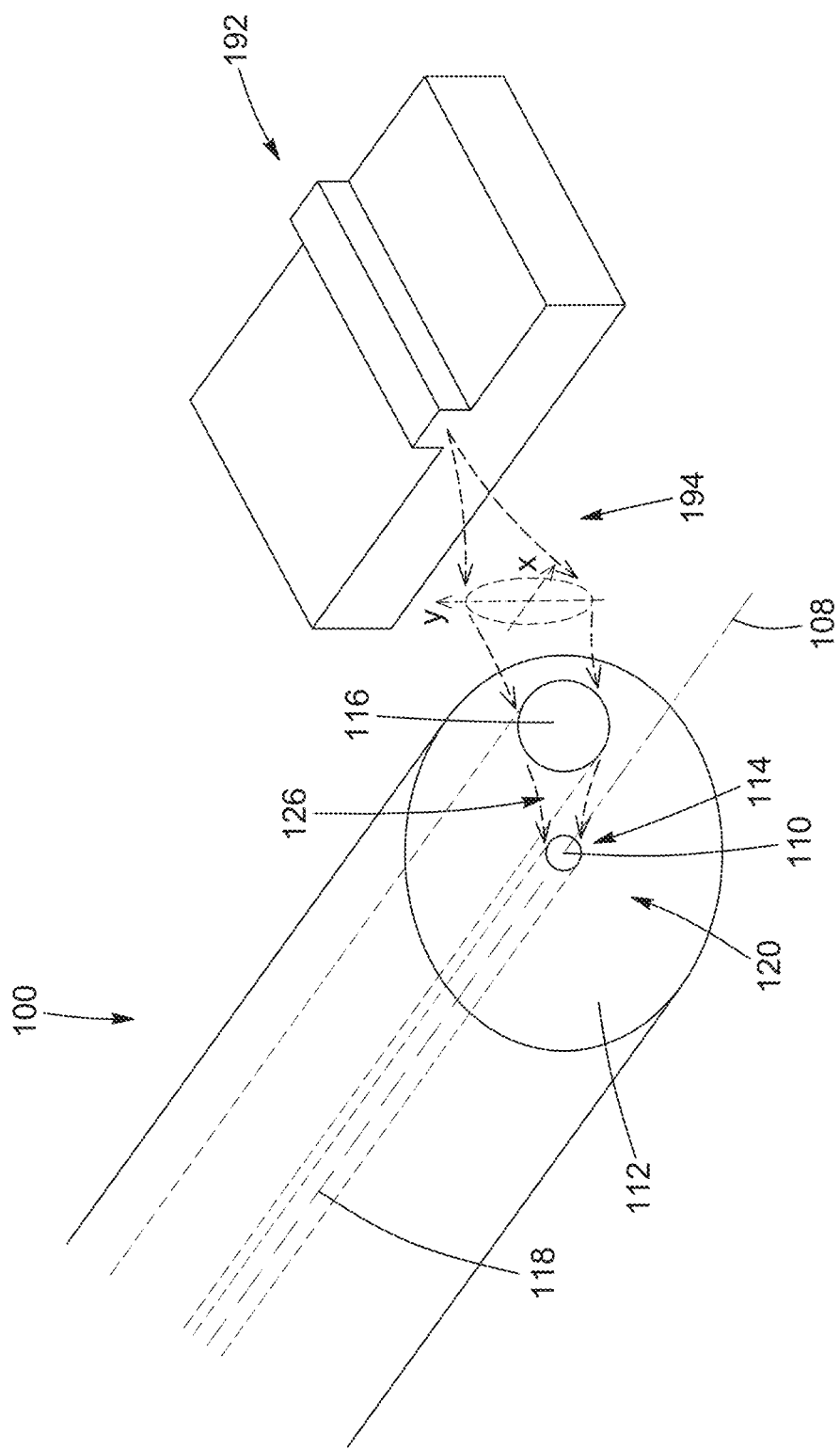

Referring to FIGS. 22A to 22D, the present techniques may be used in laser diode coupling applications. An example of a basic optical configuration is shown in FIGS. 22A to 22C. An edge-emitting laser diode 192 emits an elliptical output beam 194 having a large divergence along a fast axis (the y-axis in FIG. 22A) and a lower divergence along a slow axis (the x-axis in FIG. 22A).

An optical fiber 100 with a cladding-embedded light-converging structure 116 such as described above is positioned with respect to the diode laser 192 such that the elliptical output beam 194 is coupled into the core 110 of the fiber 100 via the lateral coupling path 126 and after reflection off the reflecting structure 114 formed by or included at the angled end 120. The light-converging structure 116 is configured to act as a fast-axis collimating lens that collimates the elliptical output beam 194 coupled along the lateral coupling path 126 in the fast-axis direction. The parameters of the light-converging structure 116 can be adjusted in accordance with the properties of the elliptical output beam 194. FIG. 22D illustrates a variant in which an antireflection coating 196 is deposited over at least the portion of the outer lateral surface 128 of the fiber 100 on which is incident the elliptical output beam 194 emitted by the laser diode 192. In some cases, an additional lens can be placed in the path of the elliptical output beam 194 before it reaches the fiber 100 to adjust the size of the beam 194 along the slow axis (the x-axis in FIG. 22A).

The fiber-based coupling techniques disclosed herein are not limited to vertical coupling but can also be used in other coupling configurations. Referring to FIGS. 23A to 23C, there is shown an optical configuration where an optical fiber 100 including an angled end 120 (e.g., at) 45° and a cladding-embedded light-converging structure 116 is used for edge coupling with a planar optical waveguide 102 having a waveguiding path 104. As for the diode laser depicted in FIGS. 22A to 22C, the planar optical waveguide 102 in FIGS. 23A to 23C outputs an elliptical output beam 194 that diverges more strongly along the vertical direction. The optical fiber 100 is positioned with its fiber axis 108 parallel to the edge of the planar optical waveguide 102 and perpendicular to the waveguiding path 104 such that the elliptical output beam 194 is coupled into the core 110 of the fiber 100 via the lateral coupling path 126 and after reflection off the reflecting structure 114 formed by or included at the angled end 120. In such implementations, the light-converging structure 116 is configured for reducing the divergence of the elliptical output beam 194 along the vertical direction. In FIGS. 23A to 23C, the optical fiber 100 is received in an optional V-groove 172 to allow for passive alignment of the fiber 100 relative to the planar optical waveguide 102. In other variants, the optical fiber 100 can also or alternatively be positioned with active alignment in front of the waveguide 102 and retained in place using external fixtures. It should be noted that the arrangement shown in FIGS. 23A to 23C could be used with other edge coupling technologies, for example inverted taper edge couplers.

In other implementations, the optical fiber disclosed herein could be used for lateral coupling of light into and/or from a vertically curved waveguide, as an alternative to a vertical coupling approach such as described in T. Yoshida et al., "Vertical silicon waveguide coupler bent by ion implantation," Optics Express, vol. 23, issue 23, pp. 29449-29456 (2015), the entire contents of which are incorporated herein by reference.

Figure 24B:
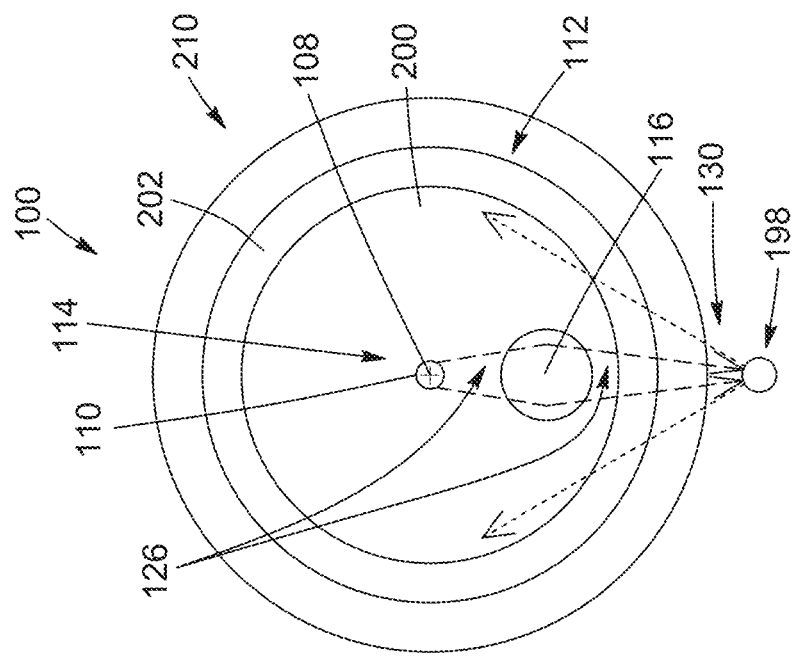
FIGS. 24A and 24B are respectively schematic side and front views of an optical fiber, in accordance with another possible embodiment, in which the optical fiber is implemented in the distal tip of a fiber probe or endoscope for probing a target of interest.
Figure 24A:
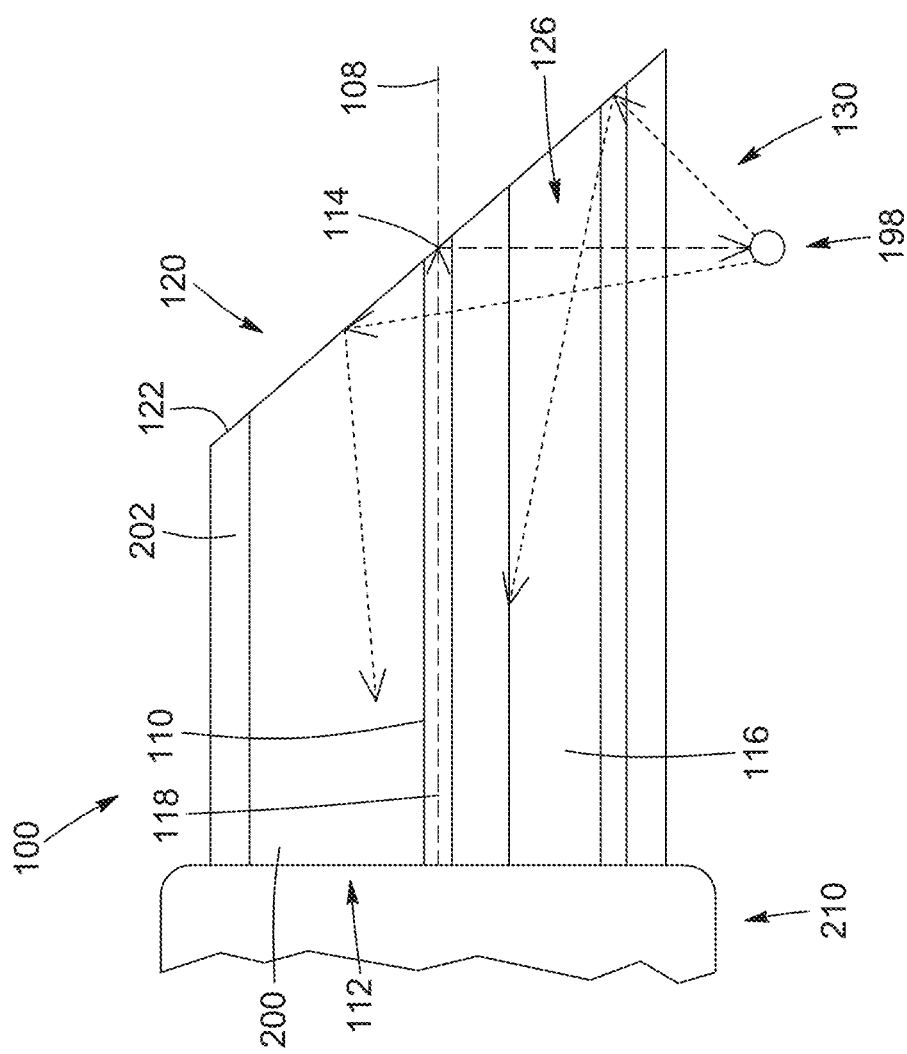

In yet other implementations, the present techniques can be applied in the field of fiber-optic endoscopy for delivering probing light, with or without signal collection. More particularly, referring to FIGS. 24A and 24B, an angled-tip optical fiber 100 with a cladding-embedded light-converging structure 116 such as disclosed herein can be used as the distal tip or end of a fiber endoscope 210. In such implementations, the light-converging structure 116 is used to shape or otherwise act on guided light coupled out of the core 110 along the lateral coupling path 126 before the out-coupled light exits the optical fiber 100 as a probing beam (dashed line). For example, the light-converging structure 116 can be used to control the dimensions and the focus distance of the probing beam in a probed region of interest 198 located outside of the optical fiber 100. In some implementations, the light-converging structure 116 can be used to make the probing beam converge sufficiently to excite fluorescence emission within a small volume of the probed region 198. In the illustrated embodiment, the optical fiber 100 has a double-clad structure in which the cladding 112 includes an inner cladding layer 200 surrounding the core 110 and an outer cladding layer 202 surrounding the inner cladding layer 200. A certain portion of the fluorescence emission (dotted line) is laterally coupled for guided propagation along the fiber 100 after traveling along the lateral coupling path 126 and reflection off the reflecting structure 114 included at or formed by the angled end 120, In the illustrated embodiment, the collected fluorescence light is guided inside the inner cladding layer 200 by total internal reflection at the interface with the outer cladding layer 202 and its optical power subsequently measured with a detector housed in the fiber endoscope 210 or elsewhere. It should be noted that the configuration shown in FIGS. 24A and 24B is not limited to fluorescence detection, and that other variants could be based on various other types of optical probing techniques including, but not limited to, optical coherence tomography, nonlinear optics microscopy such as two-photon fluorescence, second harmonic generation and coherent anti-Stokes Raman Scattering (CARS).

Of course, numerous modifications could be made to the embodiments described above without departing from the scope of the appended claims.

The invention claimed is:

1. An optical fiber for lateral optical coupling, comprising:
a cladding;
a core disposed in the cladding;
a reflecting structure inclined relative to a fiber axis and configured to reflect light between the core and a lateral coupling path extending and providing lateral coupling of light between the core and an exterior of the optical fiber; and
a light-converging structure embedded in the cladding to intercept and converge light traveling along the lateral coupling path, wherein the light-converging structure comprises one or more longitudinally extending rod insertions.

2. The optical fiber of claim 1, wherein the optical fiber has an angled end that comprises or forms the reflecting structure.

3. The optical fiber of claim 2, further comprising a fiber-coupling end opposite the angled end and configured for coupling to a main optical fiber, the optical fiber operating as a fiber-optic transition coupler for coupling light between the main optical fiber, via the fiber-coupling end, and an optical device or a probed region, via the lateral coupling path at the angled end.

4. The optical fiber of claim 3, wherein the optical fiber has a fiber length extending between the angled end and the fiber-coupling end, the fiber length ranging from about 0.1 centimeter to about 100 centimeters.

5. The optical fiber of claim 1, wherein the cladding comprises a first cladding layer surrounding the core and a second cladding layer surrounding the first cladding layer, and wherein the reflecting structure is configured to reflect guided core light out of the core and into the lateral coupling path for delivery to a probed region outside the optical fiber and to reflect light collected from the probed region from the lateral coupling path to the first cladding layer for guided propagation thereinside as guided cladding light.

6. The optical fiber of claim 1, wherein the optical fiber has a cavity extending laterally through the cladding and inside the core, the cavity comprising or forming the reflecting structure.

7. The optical fiber of claim 1, wherein the reflecting structure operates by total internal reflection inside the core.

8. The optical fiber of claim 1, wherein the reflecting structure comprises a reflecting layer formed on the core.

9. The optical fiber of claim 1, wherein the reflecting structure comprises a tilted fiber Bragg grating disposed in the core.

10. The optical fiber of claim 1, wherein the one or more longitudinally extending rod insertions comprise a refractive converging element configured to receive and focus light traveling along the lateral coupling path.

11. The optical fiber of claim 10, wherein the refractive converging element comprises a plano-convex, a biconvex or a positive meniscus cylindrical lens element made of a material having a refractive index higher than a refractive index of the cladding.

12. The optical fiber of claim 10, wherein the refractive converging element comprises a plano-concave, a biconcave or a negative meniscus cylindrical lens element made of a material having a refractive index lower than a refractive index of the cladding.

13. The optical fiber of claim 1, wherein the light-converging structure comprises a waveguiding element configured to guide light therein along a waveguiding path forming at least part of the lateral coupling path between the core and the exterior of the optical fiber.

14. The optical fiber of claim 1, wherein the light-converging structure has a longitudinal dimension that is less than a length of the cladding.

15. A coupled optical system comprising:
an optical device; and
an optical fiber optically coupled to the optical device, the optical fiber comprising:
a cladding;
a core disposed in the cladding;
a reflecting structure configured to reflect light between the core and a lateral coupling path extending in the cladding between the core and an exterior of the optical fiber to provide lateral optical coupling between the core and the optical device; and a light-converging structure embedded in the cladding to intercept and converge light traveling along the lateral coupling path, wherein the light-converging structure comprises one or more longitudinally extending rod insertions.

16. The coupled optical system of claim 15, wherein the optical device is a photonic integrated circuit comprising a planar optical waveguide.

17. The coupled optical system of claim 16, wherein the planar optical waveguide is a grating-coupled waveguide or an edge-coupled waveguide.

18. The coupled optical system of claim 15, wherein the optical device is an optical source configured to emit a source optical signal and the optical fiber is configured to collect the source optical signal via the lateral coupling path for coupling the source optical signal as guided light into the core.

19. The coupled optical system of claim 15, further comprising a support structure configured to support the optical fiber.

20. An optical fiber for lateral optical coupling, comprising:
   a cladding;
   a core disposed in the cladding;
   a reflecting structure inclined relative to a fiber axis and configured to reflect light between the core and a lateral coupling path extending and providing lateral coupling of light between the core and an exterior of the optical fiber;
   a light-converging structure embedded in the cladding to intercept and converge light traveling along the lateral coupling path;
   an angled end that comprises or forms the reflecting structure; and
   a fiber-coupling end opposite the angled end and configured for coupling to a main optical fiber, the optical fiber operating as a fiber-optic transition coupler for coupling light between the main optical fiber, via the fiber-coupling end, and an optical device or a probed region, via the lateral coupling path at the angled end.

* * * * *